United States Patent
Ohuchi et al.

(10) Patent No.: US 6,176,227 B1
(45) Date of Patent: Jan. 23, 2001

(54) CONTROL SYSTEM FOR CYLINDER INJECTION TYPE INTERNAL COMBUSTION ENGINE WITH EXHAUST GAS RECIRCULATION FEEDBACK CONTROL

(75) Inventors: Hirofumi Ohuchi; Keiichi Enoki, both of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/359,634

(22) Filed: Jul. 26, 1999

(30) Foreign Application Priority Data

Feb. 16, 1999 (JP) .................................................. 11-037217

(51) Int. Cl.$^7$ ..................................................... F02B 75/08
(52) U.S. Cl. ........................................... 123/698; 123/295
(58) Field of Search ..................................... 123/295, 305, 123/698

(56) References Cited

U.S. PATENT DOCUMENTS

| | | | |
|---|---|---|---|
| 5,150,694 | * | 9/1992 | Currie et al. ........................... 123/698 |
| 5,150,696 | * | 9/1992 | Kabasin et al. ....................... 123/698 |
| 5,546,922 | * | 8/1996 | Hara et al. ............................. 123/698 |
| 5,570,674 | * | 11/1996 | Izumiura et al. ...................... 123/698 |
| 5,611,320 | * | 3/1997 | Hara et al. ............................. 123/698 |
| 5,947,097 | * | 9/1999 | Harada ................................... 123/698 |
| 6,073,073 | * | 6/2000 | Kitamura et al. ..................... 123/698 |
| 6,089,206 | * | 7/2000 | Suzuki et al. ......................... 123/305 |

FOREIGN PATENT DOCUMENTS

| | | |
|---|---|---|
| 61-101645 | 5/1986 | (JP) . |
| 63-75327 | 4/1988 | (JP) . |
| 8-312433 | 11/1996 | (JP) . |

* cited by examiner

*Primary Examiner*—John Kwon
(74) *Attorney, Agent, or Firm*—Sughrue, Mion, Zinn, Macpeak & Seas, PLLC

(57) ABSTRACT

A control system for a cylinder injection type internal combustion engine is capable of realizing improvement of the combustion state and reduction of harmful components contained in an exhaust gas by enhancing an air-fuel ratio control accuracy in EGR control. The system includes an air flow sensor for detecting a quantity of intake air, an air-fuel ratio sensor for detecting an air-fuel ratio of exhaust gas, means for controlling exhaust gas recirculation quantity to a desired exhaust gas recirculation quantity by means of an exhaust gas recirculation regulating means, and means for setting a fuel injection quantity of the fuel injection valve in dependence on a controlled desired air-fuel ratio within engine cylinder, intake air quantity and injection mode being validated. The exhaust gas recirculation quantity control means performs a feedback control on the exhaust gas recirculation quantity so that the air-fuel ratio of the exhaust gas coincides with the desired exhaust gas air-fuel ratio.

11 Claims, 12 Drawing Sheets

CONTROL SYSTEM FOR CYLINDER INJECTION TYPE INTERNAL COMBUSTION ENGINE WITH EXHAUST GAS RECIRCULATION FEEDBACK CONTROL

BACKGROUND OF THE INVENTION

1. Field of the Invention

The present invention generally relates to a control system for an internal combustion engine of cylinder injection type (also known as the direct fuel injection type engine) in which fuel is directly injected into engine cylinders to undergo combustion therein through spark ignition. More specifically, the present invention is concerned with a control system for the cylinder injection type internal combustion engine which is capable of decreasing harmful components such as nitrogen oxides $NO_x$ contained in the exhaust gas of the engine with high reliability by controlling an exhaust gas recirculation quantity (also referred to as the EGR quantity for short) with high accuracy.

2. Description of Related Art

Heretofore, the spark ignition type (or indirect fuel injection type) internal combustion engine in which fuel is injected into an intake manifold for charging a uniform air-fuel gas mixture into engine cylinders has been well known in the art. In the internal combustion engine (hereinafter also referred to simply as the engine) of this type, an air-fuel ratio sensor is provided in an exhaust pipe with a view to controlling the air-fuel ratio (also referred to simply as the A/F ratio) so that it assumes a stoichiometric air-fuel ratio (14.7). To this end, a feedback control is adopted.

By way of example, in a conventional control system for an internal combustion engine such as described in Japanese Unexamined Patent Application Publication No. 101645/1986 (JP-A-61-101645), such a technique is adopted that error or deviation of the detected air-fuel ratio from a desired value is corrected by employing a pair of air-fuel ratio sensors.

Further, in another conventional control system for an internal combustion engine such as described in Japanese Unexamined Patent Application Publication No. 75327/1988 (JP-A-63-75327), the air-fuel ratio feedback quantity is corrected upon acceleration/deceleration of the engine by storing acceleration/deceleration quantity data in combination with air-fuel ratio feedback quantity data in the form of table or map for every region where the air-fuel ratio feedback quantity is to be corrected.

In general, with the conventional internal combustion engines such as mentioned above, a relatively high output power or torque can be generated. However, the engine of this type suffers a problem that the output torque thereof changes rather remarkably as a function of the air-fuel ratio, involving thus difficulty in carrying out the control of the output torque generated by the engine.

Such being the circumstances, there has been developed a control system for a cylinder injection type engine in which fuel is directly injected into the cylinder for burning the fuel in a predetermined region within the cylinder.

By way of example, in a conventional control system for an cylinder injection type internal combustion engine such as described in Japanese Unexamined Patent Application Publication No. 312433/1996 (JP-A-8-312433), such a control scheme is adopted according to which a desired engine torque is arithmetically determined on the basis of engine operation state, and then various control quantities such as desired air-fuel ratio, desired fuel injection timing, ignition timing, EGR quantity, and so forth are determined on the basis of the desired engine torque.

For having better understanding of the principle underlying the present invention, technical background thereof will be described below in some detail. FIG. 8 is a schematic diagram showing generally an arrangement of a conventional control system for a cylinder injection type internal combustion engine known heretofore.

Referring to FIG. 8, an engine 1 constituting an intrinsically major part of the internal combustion engine system is provided with an intake pipe 1a for introducing the intake air into the engine 1 and an exhaust pipe 1b for discharging the exhaust gas resulting from the combustion of the air-fuel mixture.

An air flow sensor 2 for detecting a flow rate or quantity Qa of the intake air fed to the engine 1 as indicated by an arrow is installed at an upstream location in the intake pipe 1a. Further installed within the intake pipe 1a is a throttle valve 3 for adjusting or regulating the intake air flow rate or quantity Qa, and a throttle position sensor 4 for detecting an opening degree θ of the throttle valve 3 is provided in association with the throttle valve 3.

Installed at a downstream location in the intake pipe 1a, i.e., at a location immediately preceding to the engine 1 is a surge tank 5. On the other hand, an air-fuel ratio sensor 6 which may be constituted by a linear type $O_2$-sensor is provided in the exhaust pipe 1b for detecting an actual air-fuel (A/F) ratio F of the exhaust gas, which ratio generally lies within a range of e.g. "10" to "50".

A throttle valve actuator 7 (serving as an intake air quantity regulating means) is provided in association with the throttle valve. 3 for adjusting or regulating the throttle valve opening degree θ. The throttle valve actuator 7 may be comprised of, for example, a stepping or stepper motor for driving rotatively and stepwise the throttle valve 3 to thereby regulate the rate or quantity Qa of the intake air flowing through the intake pipe 1a.

Installed within each of the cylinders of the engine 1 is a spark plug 8 at which electric spark discharge takes place for igniting the air-fuel mixture within the combustion chamber of the cylinder. To this end, a distributor 9 is provided for supplying a high voltage distributively to the individual spark plugs 8 in synchronism with ignition timing.

Further provided is an ignition coil 10 which is realized in the form of a transformer having primary and secondary windings. A high voltage for the spark ignition is induced in the secondary winding of the ignition coil 10 whenever a primary current flowing through the primary winding is interrupted. The high voltage is then supplied to the distributor 9. Provided in association with the ignition coil 10 is an ignitor 11 which is constituted by a power transistor for interrupting the current flowing through the primary winding of the ignition coil 10 in conformance with the ignition timing for the individual engine cylinders.

The spark plug 8, the distributor 9, the ignition coil 10 and the ignitor 11 cooperate to constitute an ignition system or means for igniting the air-fuel mixture within the individual cylinders of the engine 1.

An ECU (Electronic Control Unit) 12 which is in charge of controlling the engine system as a whole includes a microcomputer for arithmetically determining control quantities for various actuators which are installed for the purpose of controlling combustion of in the engine 1 on the basis of information detected by various types of sensors (i.e., information concerning the operation state of the engine 1), to thereby issue driving signals indicative of the control quantities to the relevant actuators.

As the signals indicative of the various types of control quantities, there may be mentioned an intake-air flow control signal A for the throttle valve actuator 7, an ignition signal G for the ignitor 11 (ignition system), a fuel injection signal J for the fuel injection valve (i.e., injector) 13, an EGR (Exhaust Gas Recirculation) control signal E for an EGR regulating valve 17, and a purge control signal P for a purge regulating valve 26 among others.

The fuel injector 13 is mounted internally of each cylinder of the engine 1 for injecting the fuel directly into the combustion chamber defined within the cylinder. A crank angle sensor 14 for generating a crank angle signal CA is installed in association with a crank shaft which is driven rotatively by the engine 1.

For detecting a depression stroke $\alpha$ of an accelerator pedal manipulated by an operator or driver of a motor vehicle or the like equipped with the engine system now under consideration, an accelerator pedal stroke sensor 15 is provided in association with the accelerator pedal (not shown).

The crank angle signal CA and the accelerator pedal depression stroke signal $\alpha$ are inputted to the ECU 12 similarly to the other sensor signals.

As other sensors, there may be provided, for example, an intake pressure sensor for detecting the intake air pressure within the intake pipe of the engine 1, an intake-air temperature sensor for detecting the temperature of the intake air, a cooling water temperature sensor for detecting the temperature of the cooling water of the engine, etc., although they are not shown in the figure.

Additionally, there may be provided another actuator for controlling the engine 1 a high-pressure pump for injecting the fuel fed from a fuel pump 24 under high pressure although not shown.

The crank angle sensor 14 is designed to output a pulse signal corresponding to the engine rotation number or engine speed (rpm) as the crank angle signal CA and serves also as an engine rotation sensor (engine speed sensor), as is well known in the art. Further, the crank angle signal CA contains pulses having edges which correspond to reference crank angles of the plural cylinders, respectively, of the engine, wherein the reference crank angles are utilized for arithmetically determining the control timing for the engine 1.

An exhaust gas recirculation passage (hereinafter also referred to as the EGR passage) 16 is provided between the exhaust pipe 1b and the surge tank 5 for recirculating a part of the exhaust gas into the intake pipe 1a, wherein a stepping-motor-driven type EGR regulating valve 17 (constituting a part of EGR regulating means) is provided in association with the EGR passage 16 for regulating the amount or quantity of the exhaust gas recirculated to the intake pipe. This quantity is referred to also as the EGR quantity QE.

An onboard battery 20 supplies electric power to the ECU 12 by way of an ignition switch 21.

Fuel 22 for the engine 1 is contained in a fuel tank 23 to be supplied to the fuel injectors 13 by way of the fuel pump 24.

Connected to one end of the fuel tank 23 is a canister 25 containing activated charcoal for adsorbing fuel gas evaporated and dispersed from the liquid fuel contained in the fuel tank 23. The gas mentioned above will hereinafter be referred to as the evaporated gas only for convenience of the description. On the other hand, the canister 25 is communicated to the surge tank 5 by way of a purge regulating valve 26 of a solenoid-driven type.

The purge regulating valve 26 constitutes a purge means for introducing the evaporated gas generated within the fuel tank 23 into the intake pipe 1a through a purge process. Thus, when the purge regulating valve 26 is opened, the evaporated gas is introduced into the intake pipe 1a with a desired purge rate or quantity QP.

The ECU 12 serves as a control quantity arithmetic means for arithmetically determining the control quantities for the various actuators to thereby output the operation control signals A, G, J, E and P for the throttle valve actuator 7, the ignitor 11, the fuel injector 13, the EGR regulating valve 17 and the purge regulating valve 26, respectively, in dependence on the operation state of the engine 1.

FIG. 9 is a block diagram showing in detail a configuration of the ECU 12 mentioned previously by reference to FIG. 8. Referring to FIG. 9, the ECU 12 includes a microcomputer 100, a first input interface circuit 101, a second input interface circuit 102, an output interface circuit 104 and a power supply circuit 105.

The first input interface circuit 101 is so designed as to shape appropriately the crank angle signal CA to thereby generate an interrupt signal, which is then inputted to the microcomputer 100.

On the other hand, the second input interface circuit 102 is so designed as to fetch the other sensor signals (e.g. signals indicative of the intake air quantity Qa, the throttle valve opening degree $\theta$, the air-fuel ratio F, the accelerator pedal depression stroke $\alpha$, etc.) as the input signals to the microcomputer 100.

The output interface circuit 104 is designed to amplify the various actuator driving signals (e.g. the intake-air flow control signal A, the ignition signal G, the fuel injection signal J, the purge control signal P, etc.) to output the amplified signals to the throttle valve actuator 7, the ignitor 11, the fuel injector 13, etc., respectively.

The power supply circuit 105 supplies electric power from the battery 20 to the microcomputer 100.

The microcomputer 100 is comprised of a CPU (Central Processing Unit) 200, a counter 201, a timer 202, an A/D (analogue-to-digital) converter 203, a random access memory (hereinafter referred to as the RAM in abbreviation) 205, a read-only memory (hereinafter referred to as the ROM in abbreviation) 206, an output port 207 and a common bus 208.

The CPU 200 serves to arithmetically determine the control quantities for the throttle valve actuator 7 and the fuel injector 13 in dependence on the engine operation state (e.g. the accelerator pedal depression stroke a and the engine rotation number Ne indicated by the crank angle signal CA) in accordance with a predetermined program or programs.

The free-running counter 201 is designed to measure a rotation period of the engine 1 on the basis of the crank angle signal CA, while the timer 202 is employed for measuring or determining various control time points or timing as well as time durations or periods of concern.

The A/D converter 203 converts the analogue signals inputted from the various sensors to digital signals which are then inputted to the CPU 200.

The RAM 205 is used as a work memory for the CPU 200 while the ROM 206 is used for storing therein various operation programs to be executed by the CPU 200.

Various control signals (e.g. the fuel injection signal J, the ignition signal G, etc.) are outputted through the output port 207. The aforementioned individual components 201, 202, 203, 205, 206 and 207 incorporated in the microcomputer 100 are connected to the CPU 200 by way of the common bus 208.

The throttle valve opening degree θ is controlled in dependence on the engine operation state by using the intake-air flow control signal A. The CPU (serving as the control quantity arithmetic means) 200 incorporated in the ECU 12 arithmetically determines the fuel injection quantity on the basis of the crank angle CA (engine rotation number Ne in rpm) and the accelerator pedal depression stroke α.

The fuel injector 13 is actuated in response to the fuel injection signal J having a pulse width which corresponds to the fuel injection quantity, to thereby inject a required amount or quantity of fuel into the cylinder at a predetermined timing which is derived from the crank angle signal CA. In that case, the fuel is supplied to the fuel injector 13 under a very high pressure because the fuel has to be injected directly into the cylinder.

The CPU 200 (serving as the control quantity arithmetic means) includes an injection mode changeover means for changing over the injection mode (the time point or timing at which the fuel injector 13 is actuated) in conformance with the engine operation state. As the injection modes, there may be mentioned a compression-stroke injection mode in which the fuel injection is performed in the compression stroke of the engine for realizing a stratified lean burning and a suction-stroke injection mode in which the fuel is injected in the suction stroke of the engine for realizing a lean burning or a stoichiometric feedback burning (burning of enriched fuel mixture).

Additionally, the CPU 200 is designed to issue the ignition signal G to the ignitor 11 in synchronism with the fuel injection timing. The ignitor 11 operates in response to the ignition signal G to electrically energize the ignition coil 10 for producing the electric spark discharge at the spark plug 8 in a predetermined timing by way of the distributor 9.

Next, description will be directed to the operation of the conventional control system for the cylinder injection type internal combustion engine of the structure described above by reference to FIGS. 8 and 9.

When the crank angle signal CA is inputted to the ECU 12A, an interrupt signal is issued through the first input interface circuit 101 in response to a pulse edge of the crank angle signal CA.

In response to the interrupt signal, the CPU 200 reads out the content or value of the counter 201 to thereby determine arithmetically the rotation period of the engine 1 on the basis of a difference between a current counter value and a preceding one, the rotation period as determined being then stored in the RAM 205. Further, the CPU 200 arithmetically determines the engine rotation number or engine speed Ne (rpm) on the basis of the above-mentioned rotation period and the measured time or period corresponding to a predetermined crank angle which can be derived from the crank angle signal CA.

On the other hand, through the second input interface circuit 102, the analogue sensor signals such as the signals indicative of the accelerator pedal depression stroke a and others are fetched to be supplied to the CPU 200 after having been converted to the corresponding digital signals by the A/D converter 203.

The control quantity arithmetic means realized by the CPU 200 arithmetically determines various control parameters or quantities on the basis of the sensor information indicative of the engine operation states to thereby output driving signals corresponding to the control quantities to the relevant actuators mentioned previously by way of the output port 207 and the output interface circuit 104.

By way of example, the CPU 200 incorporated in the ECU 12 arithmetically determines a desired opening degree of the throttle valve (hereinafter referred to as the desired throttle valve opening degree) on the basis of the sensor signal indicative of the accelerator pedal depression stroke a to thereby output the intake-air flow control signal A which indicates the desired throttle valve opening degree. In response to this signal A, the throttle valve actuator 7 is so driven that the actual throttle valve opening degree detected by the throttle position sensor 4 coincides with the above-mentioned desired throttle valve opening degree.

Further, the CPU 200 arithmetically determines a desired fuel injection quantity to thereby output the fuel injection signal J which indicates the desired fuel injection quantity. In response thereto, the fuel injector 13 is actuated in the predetermined timing based on the crank angle signal CA to inject the fuel directly into the cylinder of the engine 1 so that the fuel as injected coincide with the desired fuel injection quantity.

Besides, the CPU 200 arithmetically determines a desired ignition timing to output the ignition signal G indicative of the desired ignition timing for thereby driving the ignitor 11 at a predetermined timing in synchronism with the fuel injection timing.

As a result of this, the primary current of the ignition coil 10 is interrupted in response to the ignition signal G, whereby the high voltage induced in the secondary winding of the ignition coil 10 is applied to the spark plug 8 through the distributor 9. Thus, electric discharge occurs at the spark plug 8 at the predetermined ignition timing to generate the spark for ignition.

Furthermore, the EGR regulating valve 17 is driven in response to the EGR control signal E conforming to the engine operation state, whereby the EGR quantity QE is controlled optimally. Additionally, feedback control is performed on the fuel quantity on the basis of the air-fuel ratio F detected by the air-fuel ratio sensor 6 so that the actual air-fuel ratio coincides with the desired air-fuel ratio.

Next, referring to FIGS. 10 to 12 together with FIGS. 8 and 9, description will be made of operation of the conventional control system for the cylinder injection type internal combustion engine in the concrete. FIG. 10 is a flow chart for illustrating typical operations of the ECU 12.

FIG. 11 is a graphic view for illustrating two-dimensionally preset regions of desired EGR ratios (%) corresponding or equivalent to desired EGR quantities Eo in the compression-stroke injection mode (stratified lean burn mode). In FIG. 11, the engine rotation number or engine speed Ne (rpm) is taken along the abscissa with the accelerator pedal depression stroke α (%) indicative of the engine load being taken along the ordinate, wherein the desired EGR ratio assumes a maximum value which is greater than e.g. 40% or more when the engine rotation number Ne and the accelerator pedal depression stroke α are at middle levels, respectively.

FIG. 12 is a view for graphically illustrating a relation between the desired EGR quantity Eo in liter/sec and an opening degree θE of the EGR regulating valve 17 in terms of the number of times the EGR regulating valve 17 is driven stepwise.

During operation of the engine 1, signals outputted from the various types of sensors and indicating the engine operation state are inputted to the ECU 12, which executes a processing illustrated in FIG. 10 on the basis of the crank angle signal CA at every predetermined ignition timing or every predetermined time.

Referring to FIG. 10, in a step S2, the ECU 12 determines discriminatively the engine operation state on the basis of the engine rotation number Ne, the accelerator pedal depression stroke α, etc. in a step S1, and then determines arithmetically the desired EGR quantity Eo by referencing the two-dimensional data map of the EGR ratios (see FIG. 11).

In succession, the ECU 12 generates the EGR control signal E on the basis of the characteristic data of the EGR valve opening degree θE (see FIG. 12) so that the EGR quantity QE coincides with the desired EGR quantity Eo. Operation of the EGR regulating valve 17 is controlled by the EGR control signal E (step S3).

Subsequently, the ECU 12 arithmetically determines the desired exhaust gas air-fuel ratio A/Fo conforming to the current engine operation state (step S4).

Furthermore, in a step S5, the ECU 12 arithmetically determines combustion parameters (the desired fuel injection quantity, the desired fuel injection timing and the desired ignition timing) on the basis of the desired air-fuel ratio A/Fo and the intake air quantity Qa to generate the fuel injection signal J and the ignition signal G which conform to the above-mentioned control quantities, for thereby controlling operations of the fuel injector 13 and the ignitor 11, respectively.

In succession, the ECU 12 detects the air-fuel ratio F of the exhaust gas resulting from the actual combustion on the basis of the output signal of the air-fuel ratio sensor 6 in a step S6, while making decision as to whether or not the engine is in the compression-stroke injection mode (stratified lean burn mode) in a step S7.

When decision is made that the engine is in the compression-stroke injection mode (i.e., when the step S7 results in affirmation "YES"), the fuel injection control in the compression-stroke injection mode (not shown) is executed, whereon the processing routine illustrated in FIG. 10 makes return to the starting state "START" (i.e., the state ready for starting again the processing routine).

On the other hand, when it is decided that the engine operation is not in the compression-stroke injection mode (i.e., when the decision step results in negation "NO"), this means that the engine operates in the suction-stroke injection mode (stoichiometric burn mode). Accordingly, the ECU 12 executes the feedback control so that the actual air-fuel ratio F coincides with the desired exhaust gas air-fuel ratio A/Fo in a step S8), whereon the processing routine shown in FIG. 10 returns to the starting state "START".

In this manner, a predetermined amount or quantity of fuel is injected in each cylinder of the engine 1, and an air-fuel mixture containing the fuel is fired or ignited within the cylinder at a predetermined timing, whereby optimum operation of the engine 1 can be ensured.

However, in the case of the cylinder injection type engine 1, combustion or burning takes place with a very large air-fuel ratio (for very lean burning), differing from the conventional indirect injection type engine in which the fuel is injected into the intake manifold. Accordingly, the exhaust gas recirculated through the EGR passage 16 contains a relatively large amount of fresh air in addition to the intrinsic exhaust gas.

Consequently, the air-fuel ratio prevailing within the cylinder after the combustion performed with the fuel injection quantity set so that the air-fuel ratio F detected actually becomes equal to the desired exhaust gas air-fuel ratio A/Fo in the state where the EGR regulating valve 17 is fully closed (i.e., the EGR quantity QE is zero) differs from the air-fuel ratio prevailing within the cylinder after the combustion performed by setting the fuel injection quantity similarly but in the state where the EGR regulating valve 17 is opened, because the EGR quantity QE contains the fresh air.

More specifically, in the indirect fuel injection type engine where the fuel is injected into the intake manifold 1a, the exhaust gas for the EGR is exactly the gas resulting from the burning or combustion in the intrinsic sense. However, in the case of the engine 1 of the cylinder injection type, the gas which undergoes the recirculation contains not only the exhaust gas in the intrinsic sense (i.e., gas resulting from the combustion) but also the fresh air which has made no contribution to the burning in the stratified combustion mode.

The relation described above can be represented by the undermentioned expression (1) in the case of the intake manifold injection type engine.

$$A/Fo=Qan/Fj=A/Fr \tag{1}$$

where A/Fo represents the desired exhaust gas air-fuel ratio, Qan represents the amount or quantity of fresh air charged into the engine 1, Fj represents the quantity of fuel injected into the engine 1 and A/Fr represents the actual or real air-fuel ratio.

By contrast, in the case of the cylinder injection type engine, the recirculated exhaust gas containing the fresh air is charged into the engine 1. Consequently, the real air-fuel ratio A/Fr appearing in the above expression (1) is modified as follows:

$$A/Fr=(Qan+QEn)/Fj \tag{2}$$

where QEn represents the amount or quantity of fresh air which is contained in the exhaust gas (i.e., the quantity of fresh air which has not contributed to the combustion in the stratified lean burn).

As can be seen from the above expression (2), in the case of the cylinder injection type engine 1, the content of the fresh air (QEn) contributes to increase of the air-fuel ratio A/Fr. For this reason, the inconvenience mentioned previously is incurred.

Furthermore, it is noted that since error contained in the output of the air-fuel ratio sensor 6 generally increases in the lean region where the air-fuel ratio is large A/F>30), the reliability of the air-fuel ratio control in the state where the EGR operation is being validated is further degraded.

Furthermore, it is to be added that upon engine accelerating operation, the purge regulating valve 26 is opened for feeding the evaporated gas adsorbed in the canister 25 into the surge tank 5 to increase materially the fuel injection quantity for thereby enriching the air-fuel mixture for combustion. Thus, the reliability of the air-fuel ratio control will be degraded during such purge process.

Next, referring to FIGS. 13 and 14, description will turn to the purge process in the control system for the cylinder injection type internal combustion engine known heretofore. FIG. 13 is a flow chart for illustrating a processing procedure for operating the purge regulating valve 26, and FIG. 14 is a view for graphically illustrating a relation between a purge valve driving duty ratio Dp and an actual purge quantity QP.

Referring to FIG. 13, the ECU 12 makes decision as to whether or not the condition for the purge operation is met by deciding whether or not a predetermined time has lapsed from the time point the warm-up operation of the engine 1 was started (step S11).

Unless the condition for the purge operation is met (i.e., when the step S11 is "NO"), the processing routine shown in FIG. 13 makes return to the starting state "START" without executing any processing. On the contrary, when the condition for the purge operation is met (i.e., when the decision step S11 results in "YES"), a desired purge quantity QPo is arithmetically determined in a step S12 by referencing the two-dimensional data map prepared previously on the basis of the engine rotation number Ne and the accelerator pedal depression stroke α (equivalent to the engine load).

In succession, in order to determine the required purge quantity QP, the characteristic data of the purge valve driving duty ratio Dp such as illustrated in FIG. 14 is referenced. More specifically, the ECU 12 determines the driving or operation duty ratio Dp for the purge regulating valve 26 on the basis of the relation between the desired purge quantity QPo and the purge valve driving duty ratio Dp.

Subsequently, the ECU 12 generates the purge control signal P for making available the requisite purge quantity (requisite quantity of purged fuel) QP by driving or operating the purge regulating valve 26 in a step S14, whereon the processing routine illustrated in FIG. 13 returns to the starting state "START".

As is apparent from the foregoing description, the control system for the cylinder injection type internal combustion engine is not in the position to eliminate or remove sufficiently the harmful components such as $NO_x$ contained in the exhaust gas because the actual EGR quantity QE can not be controlled to an appropriate value conformable to the load of the engine 1, suffering thus a problem that the combustion (or burning) behavior of the engine (and hence drivability of the motor vehicle) is degraded with harmful components such as $NO_x$ contained in the exhaust gas being increased.

Besides, because error or deviation is brought about by the air-fuel ratio sensor 6 due to the difference between the compression-stroke injection mode (stratified lean burn mode) and the suction-stroke injection mode (stoichiometric burn mode) as described above, there arises a problem that the combustion state or behavior and the exhaust gas quality will become worse.

Besides, in the case where the purge quantity QP of the evaporated gas is controlled by driving correspondingly the purge regulating valve 26, error or deviation occurs in the air-fuel ratio control, incurring degradation of the combustion behavior and the exhaust gas quality.

SUMMARY OF THE INVENTION

In the light of the state of the art described above, it is an object of the present invention to provide a control system for the cylinder injection type internal combustion engine which system is capable of realizing improvement of the combustion state or behavior of the engine as well as reduction of harmful components contained in the exhaust gas by enhancing the air-fuel ratio control accuracy during the EGR control.

Another object of the present invention is to provide a control system for the cylinder injection type internal combustion engine which system is capable of realizing improvement of the combustion state or behavior of the engine as well as reduction of harmful components contained in the exhaust gas by correcting error components contained in the output signal of the air-fuel ratio sensor.

A further object of the present invention is to provide a control system for the cylinder injection type internal combustion engine which is capable of realizing improvement of the combustion state or behavior of the engine as well as reduction of harmful components contained in the exhaust gas by correcting error involved in the air-fuel ratio control when purge operation is performed for the evaporated gas.

In view of the above and other objects which will become apparent as the description proceeds, the present invention is directed to a control system for an internal combustion engine of a cylinder injection type, which includes fuel injection valves for injecting fuel directly into a plurality of cylinders, respectively, of the internal combustion engine, an exhaust gas recirculation regulating means for regulating an exhaust gas recirculation quantity representative of a quantity of exhaust gas of the engine which is to be recirculated to an intake pipe thereof, sensors of various types for detecting operation states of the internal combustion engine, and a control quantity arithmetic means for controlling the fuel injection valves and the exhaust gas recirculation regulating means in dependence on the engine operation state, wherein the various types of sensors includes an intake air quantity sensor for detecting the quantity of intake air fed to the engine, and an air-fuel ratio sensor disposed within an exhaust pipe of the engine for detecting an air-fuel ratio of the exhaust gas within the exhaust pipe.

In the control system for the cylinder injection type internal combustion engine described above, it is proposed according to a general aspect of the present invention that the control quantity arithmetic means is comprised of an injection mode changeover means for changing over an injection mode of the fuel injection valve to a compression-stroke injection mode or to a suction-stroke injection mode in dependence on the engine operation state, an exhaust gas recirculation quantity control means for arithmetically determining a desired exhaust gas recirculation quantity in dependence on the engine operation state and controlling the exhaust gas recirculation quantity to the desired exhaust gas recirculation quantity by means of the exhaust gas recirculation regulating means, a desired exhaust gas air-fuel ratio arithmetic means for arithmetically determining a controlled desired air-fuel ratio within the exhaust pipe of the engine in dependence on the engine operation state, a controlled desired air-fuel ratio arithmetic means for arithmetically determining a desired air-fuel ratio within the cylinder in dependence on the engine operation state, and a fuel injection quantity setting means for setting a fuel injection quantity of the fuel injection valve in dependence on the controlled desired air-fuel ratio, the intake air quantity and the injection mode, wherein the exhaust gas recirculation quantity control means is so designed as to perform a feedback control on the exhaust gas recirculation quantity so that the air-fuel ratio of the exhaust gas coincides with the desired exhaust gas air-fuel ratio.

By virtue of the arrangement described above, the air-fuel ratio can be controlled with enhanced accuracy even in the state where the EGR control is validated, whereby improvement of the combustion behavior of the engine as well as reduction of harmful components contained in the exhaust gas such as $NO_x$ can be realized.

In a preferred mode for carrying out the invention, the exhaust gas recirculation quantity control means may be so designed as to include an exhaust gas recirculation quantity storage means for storing a set exhaust gas recirculation quantity set changeably through feedback control of the exhaust gas recirculation quantity. In that case, the set exhaust gas recirculation quantity may be employed as an initial value upon starting of a succeeding feedback control of the exhaust gas recirculation quantity.

In another preferred mode for carrying out the invention, the exhaust gas recirculation quantity control means may be so designed as to execute the feedback control only when the injection mode is a compression-stroke injection mode.

In yet another preferred mode for carrying out the invention, the fuel injection quantity setting means may be so designed as to perform a feedback control on the fuel injection quantity at least when the injection mode is a suction-stroke injection mode so that the air-fuel ratio of the exhaust gas can coincide with the controlled desired air-fuel ratio. On the other hand, the exhaust gas recirculation quantity control means may be so designed as to perform the feedback control on the exhaust gas recirculation quantity at least when the injection mode is set to a compression-stroke injection mode so that the air-fuel ratio of the exhaust gas can coincide with the desired exhaust gas air-fuel ratio.

In still another preferred mode for carrying out the invention, the fuel injection quantity setting means may be so designed as to include a fuel injection quantity storage means for storing a set fuel injection quantity set changeably through feedback control of the fuel injection quantity so that the set fuel injection quantity can be used as an initial value upon starting of a succeeding feedback control of the fuel injection quantity. In that case, the exhaust gas recirculation quantity control means may be so designed as to include an exhaust gas recirculation quantity storage means for storing the set exhaust gas recirculation quantity set changeably through feedback control of the exhaust gas recirculation quantity so that the set exhaust gas recirculation quantity can be used as an initial value upon starting of a succeeding feedback control of the exhaust gas recirculation quantity.

In a further preferred mode for carrying out the invention, the fuel injection quantity setting means may be so designed as to correct the fuel injection quantity by using the set fuel injection quantity stored in the fuel injection quantity storage means upon feedback control of the fuel injection quantity. In that case, the exhaust gas recirculation quantity control means may be so designed as to correct the exhaust gas recirculation quantity by using the set exhaust gas recirculation quantity stored in the exhaust gas recirculation quantity storage means upon feedback control of the exhaust gas recirculation quantity.

In a yet further preferred mode for carrying out the invention, the control quantity arithmetic means may further include an exhaust gas recirculation control condition decision means for deciding condition for enabling feedback control of the exhaust gas recirculation quantity in dependence on the engine operation state. In that case, the fuel injection quantity setting means may be so designed as to perform the feedback control of the fuel injection quantity so that the air-fuel ratio within the exhaust pipe coincides with the desired exhaust gas air-fuel ratio even when the condition for the exhaust gas recirculation control is not satisfied, provided that the injection mode is set to the compression-stroke injection mode.

In a still further preferred mode for carrying out the invention, the fuel injection quantity setting means may include a fuel injection quantity storage means for storing set fuel injection quantities which are set variably in the compression-stroke injection mode and the suction-stroke injection mode, respectively, wherein when the injection mode is set to a suction-stroke injection mode or a compression-stroke injection mode, feedback control of the fuel injection quantity is performed so that the air-fuel ratio prevailing within the exhaust pipe coincides with the controlled desired air-fuel ratio. Besides, the set fuel injection quantities stored in the fuel injection quantity storage means can be employed as initial values upon starting of a succeeding feedback control of the fuel injection quantity.

By virtue of the arrangements described above, it is possible to realize further reduction of harmful components contained in the exhaust as well as further and improvement of the combustion performance of the engine.

In another preferred mode for carrying out the invention, the control quantity arithmetic means may further include a set fuel injection quantity comparison means for comparing the set fuel injection quantities for the compression-stroke injection mode and for the suction-stroke injection mode, respectively, the set fuel injection quantities being stored in the fuel injection quantity storage means, and an air-fuel ratio correcting means for correcting compensating for error component of the air-fuel ratio detected by the air-fuel ratio sensor on the basis of the result of the comparison performed by the set fuel injection quantity comparison means.

Owing to the arrangement mentioned above, further improvement of the combustion state or performance of the engine as well as further reduction of harmful components contained in the exhaust gas can be realized because the error component of the output signal of the air-fuel ratio sensor can be compensated for.

In yet another preferred mode for carrying out the invention, the control system for the cylinder injection type engine mentioned above may further include a fuel tank for storing fuel for injection into the engine, and a purge means for introducing evaporated gas generated within the fuel tank into the intake pipe through a purge process. In that case, the control quantity arithmetic means may include a purge decision means for deciding whether or not the evaporated gas is undergoing the purge process, and the exhaust gas recirculation quantity control means may be so designed as to perform a divisional feedback control of the exhaust gas recirculation quantity in dependence on the result of the decision made by the purge decision means.

In a further preferred mode for carrying out the invention, the control quantity arithmetic means may include a purged fuel density estimating means for arithmetically estimating a purged fuel density of the evaporated gas on the basis of a deviation involved in the feedback control performed on the exhaust gas recirculation quantity in conformance with the result of the decision made by the purge decision means, and a correction control means for correcting at least one of a purge quantity in the purge process and the fuel injection quantity in dependence on density of the purged fuel.

With the arrangements of the control system described above, improvement of the combustion state or performance of the engine as well as reduction of harmful components contained in the exhaust gas can be realized because error involved in the air-fuel ratio control by the purge process can be corrected or compensated for.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
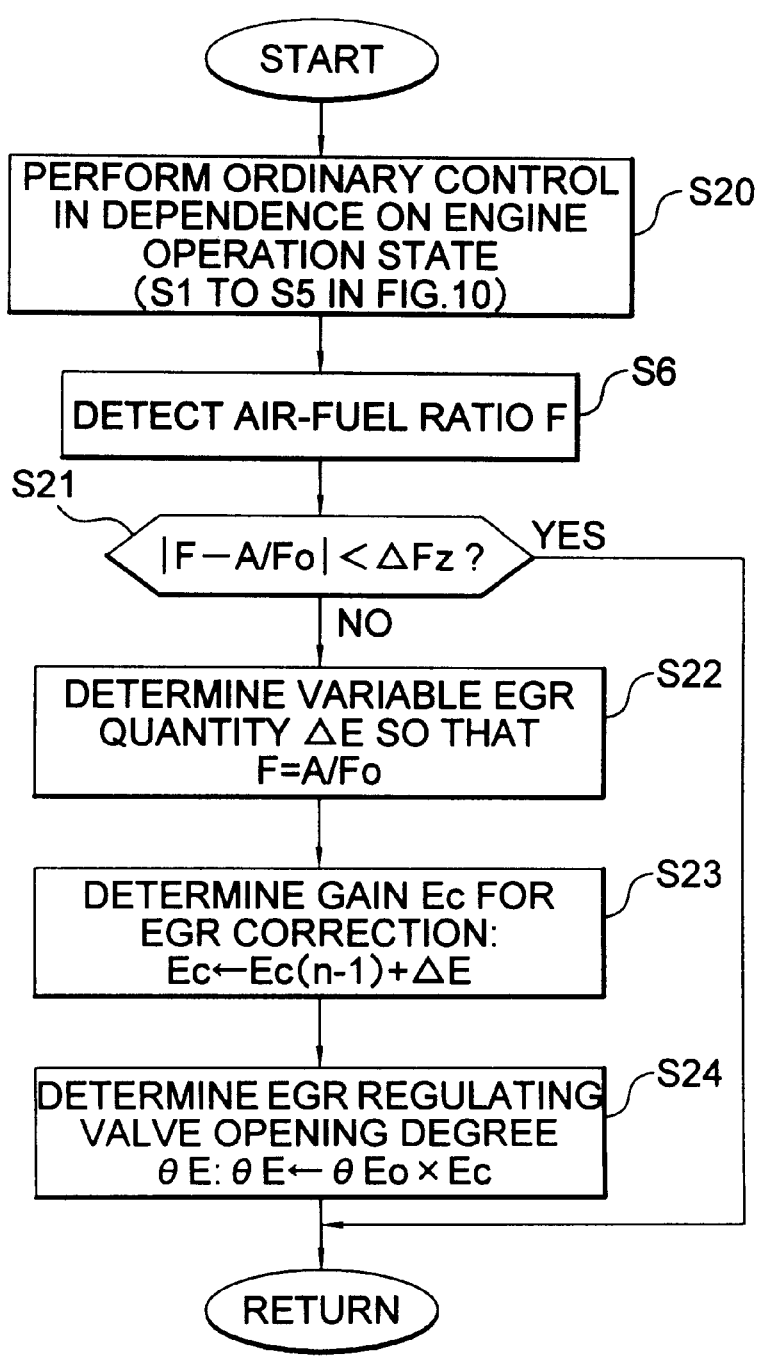
FIG. 1 is a flow chart for illustrating a feedback control operation of an EGR quantity in a control system for a cylinder injection type internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Figure 8:
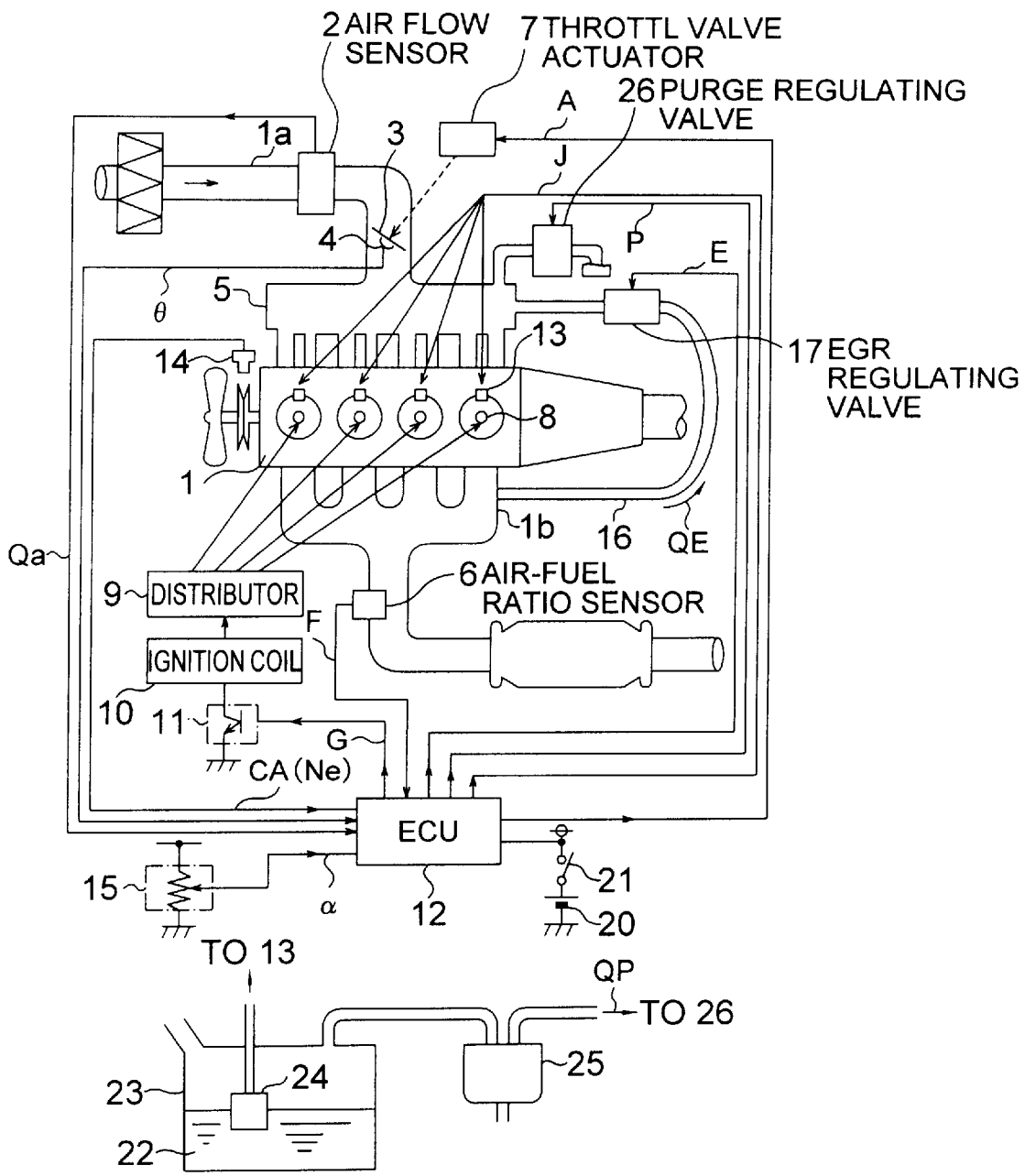
FIG. 8 is a schematic diagram showing generally an arrangement of a control system for a cylinder injection type internal combustion engine equipped with a canister.
Figure 9:
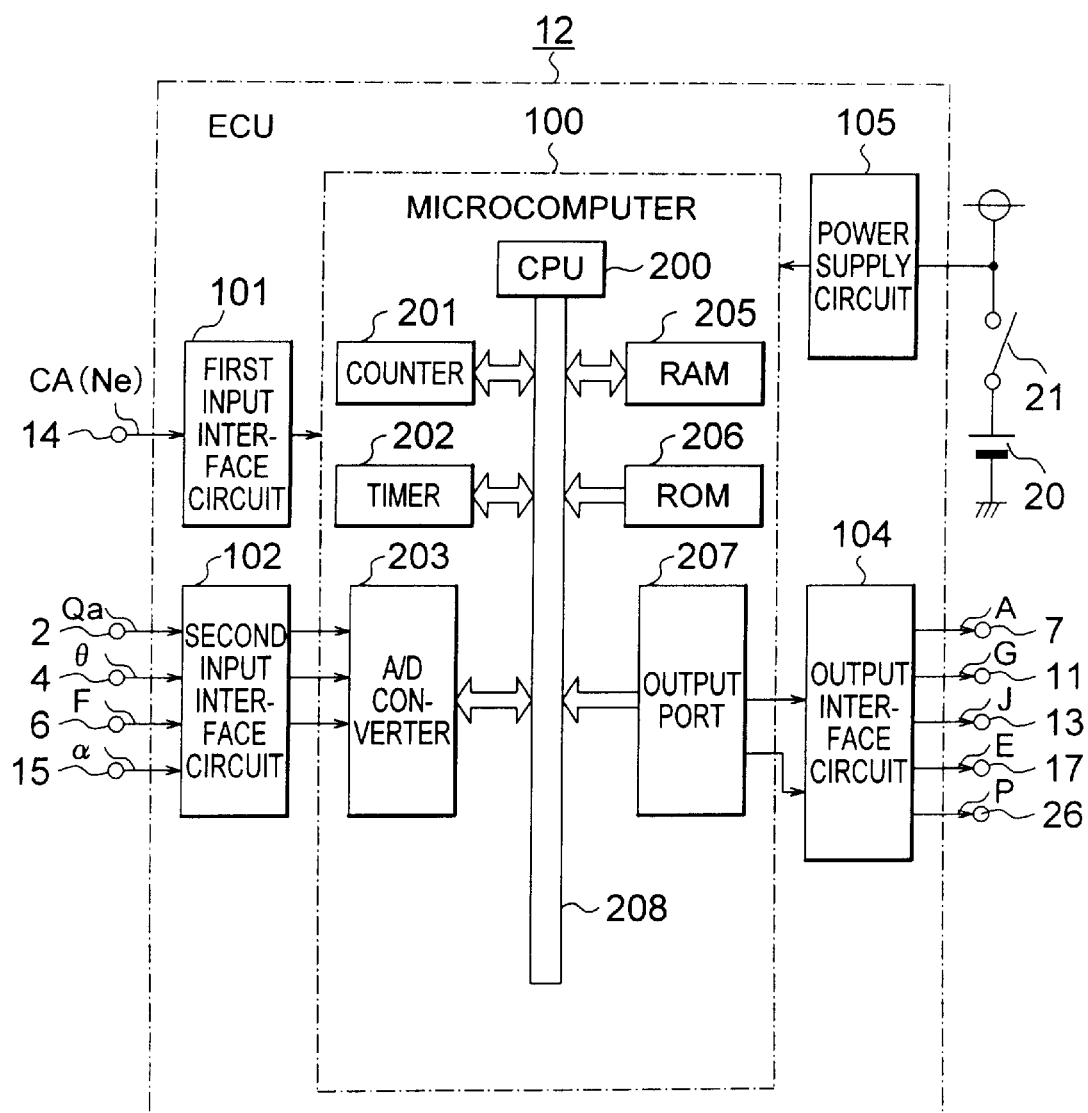
FIG. 9 is a block diagram showing in detail a configuration of an ECU (Electronic Control Unit) shown in FIG. 8.

Now, the control system for the cylinder injection type internal combustion engine according to a first embodiment of the present invention will be described by reference to the drawings. At this juncture, it should first be mentioned that the configuration or arrangement of the control system according to the first embodiment is substantially same as that of the system described hereinbefore by reference to FIGS. 8 and 9 except for several differences in the control programs executed by the CPU 200 (serving as the control quantity arithmetic means) incorporated in the ECU 12.

Similarly to the conventional control system for the cylinder injection type engine described hereinbefore, the ECU 12 is comprised of an injection mode changeover means for changing over the injection mode to the compression-stroke injection mode or to the suction-stroke injection mode in dependence on the engine operation states, and an arithmetic means for arithmetically determining desired control quantities such as the desired throttle valve opening degree, the desired EGR quantity, the desired air-fuel ratio, the desired fuel injection timing, the desired fuel injection quantity, the desired ignition timing, the desired purge quantity and/or the like in dependence on the engine operation states and the injection modes.

Further, the ECU 12 includes an EGR quantity control means for controlling the EGR quantity QE to the desired EGR quantity Eo in dependence on the engine operation state, a desired exhaust gas air-fuel ratio arithmetic means for arithmetically determining a desired air-fuel ratio A/Fo of the exhaust gas, a controlled desired air-fuel ratio arithmetic means for arithmetically determining a controlled desired air-fuel ratio and a fuel injection quantity setting means for determining or setting the fuel injection quantity, as will be described in more detail later on.

The EGR quantity control means incorporated in the ECU 12 is designed to perform a feedback control on the EGR quantity QE so that the air-fuel ratio F prevailing within the exhaust pipe 1b can coincide with the desired exhaust gas air-fuel ratio A/Fo.

Figure 2:
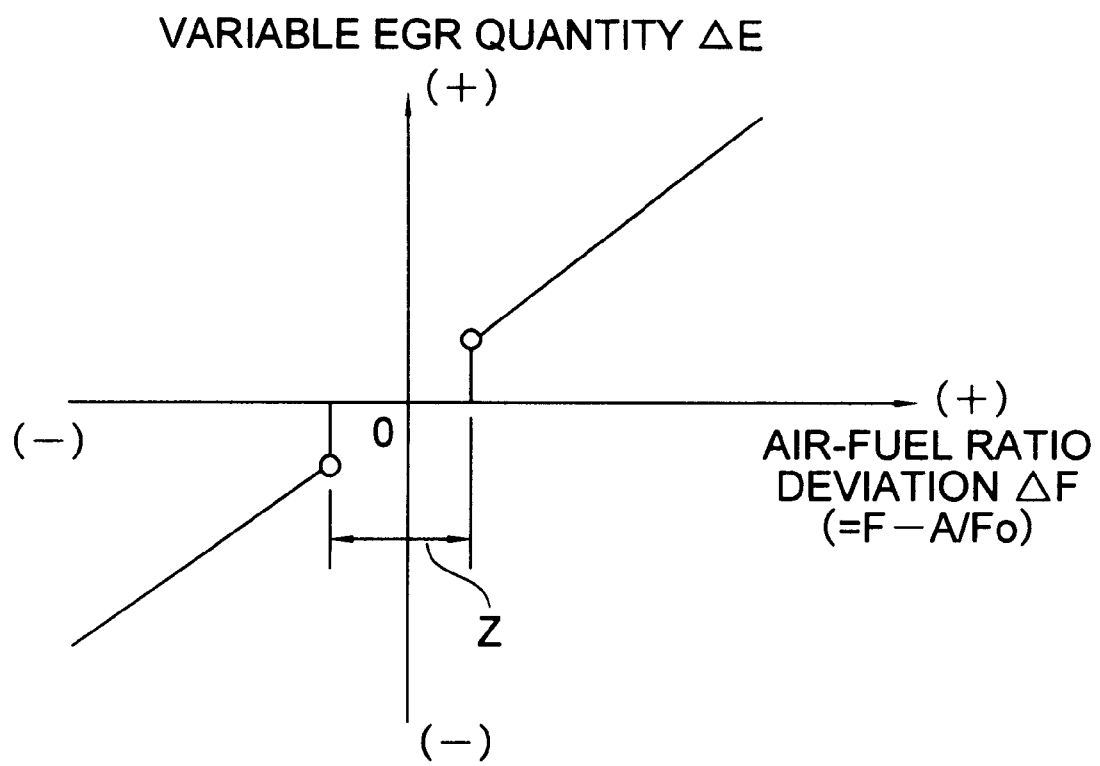
FIG. 2 is a view for graphically illustrating a relation between deviation of an air-fuel ratio occurring upon feedback control of the EGR quantity and a variable control gain of the EGR quantity in the control system according to the first embodiment of the invention.

Next, referring to FIGS. 1 and 2 together with FIGS. 8 to 14, description will be directed to operations of the control system for the cylinder injection type engine according to the first embodiment of the invention. FIG. 1 is a flow chart for illustrating typical operations of the control system according to the first embodiment of the invention, and FIG. 2 is a view for graphically illustrating a relation between deviation of the air-fuel ratio (hereinafter also referred to as the air-fuel ratio deviation or error) $\Delta F$ ($=F-A/Fo$) and a variable EGR quantity $\Delta E$ (EGR variable or gain).

Referring to FIG. 2, the air-fuel ratio deviation $\Delta F$ shown, being taken along the abscissa, is determined as a difference ($F-A/Fo$) between the actual air-fuel ratio F detected by the air-fuel ratio sensor 6 and the desired exhaust gas air-fuel ratio A/Fo. A dead zone or band Z is set up in a region where the absolute value of the air-fuel ratio deviation $\Delta F$ is small. In the dead band Z, the variable EGR quantity $\Delta E$ is set fixedly to "0" (zero).

As described hereinbefore, the ECU 12 stores a plurality of data maps in correspondence to the engine operation states, respectively, for setting the control quantity in dependence on the accelerator pedal depression stroke $\alpha$ and the engine rotation number Ne and others in conformance with the injection mode for thereby controlling the engine operation so that a predetermined output torque can be generated while ensuring an optimum exhaust gas quality.

Figure 10:
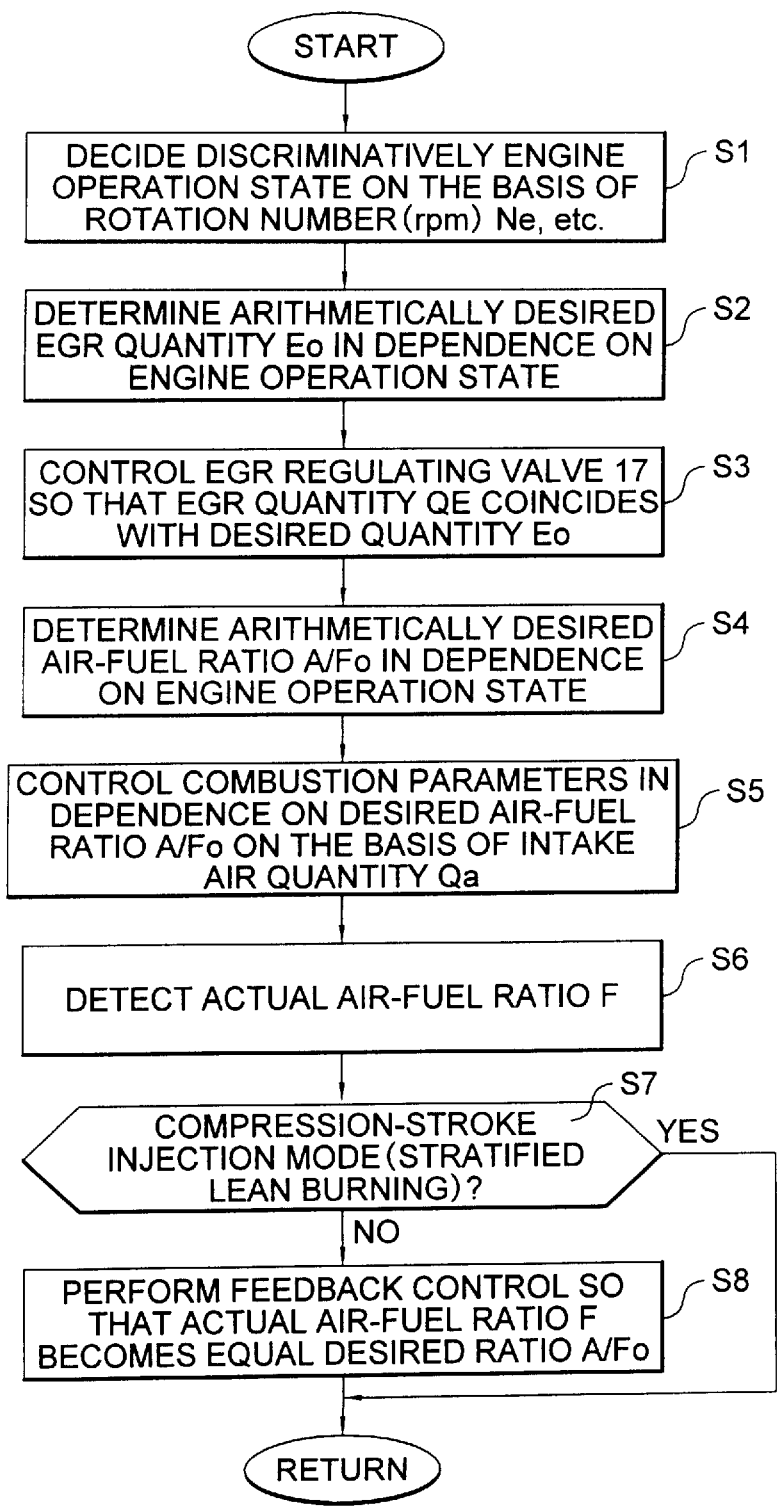
FIG. 10 is a flow chart for illustrating a processing procedure for controlling an air-fuel ratio through feedback in a conventional control system for a cylinder injection type internal combustion engine.

In FIG. 1, a processing step S20 corresponds to the processing steps S1 to S5 (i.e., ordinary control processing which depends on the engine operation state) described hereinbefore by reference to FIG. 10. Therefore, further description of the step. S20 will be unnecessary. In a step S6, an air-fuel ratio detection processing similar to that described hereinbefore is executed.

Further, it should be mentioned that in FIG. 1, the injection mode decision processing (step S7 in FIG. 10) is omitted from illustration for simplification. In the following description, it is assumed that the compression-stroke injection mode (stratified lean burn mode) is validated.

Figure 11:
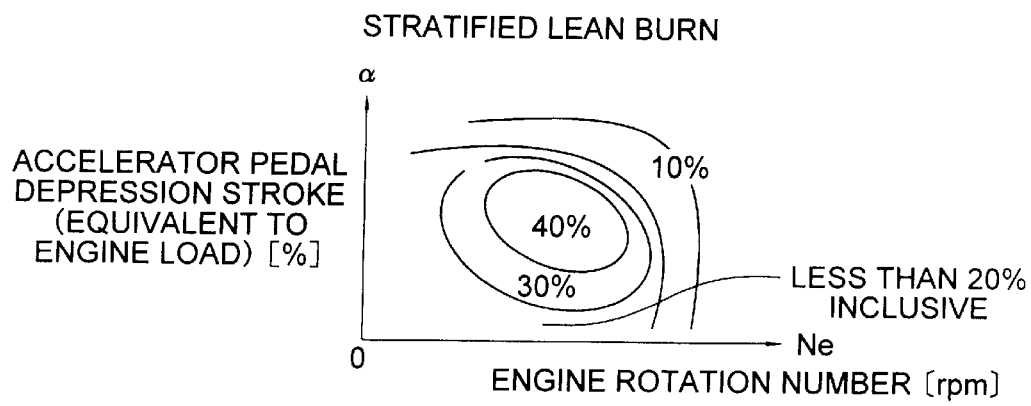
FIG. 11 is a view for graphically illustrating in a two-dimensional (map EGR quantities in a compression-stroke injection mode (stratified lean burn) in the conventional control system of the cylinder injection type, engine.
Figure 12:
FIG. 12 is a characteristic diagram for graphically illustrating a relation between a desired EGR quantity and an opening degree of an EGR regulating valve in the conventional control system for the cylinder injection type engine.
Figure 13:
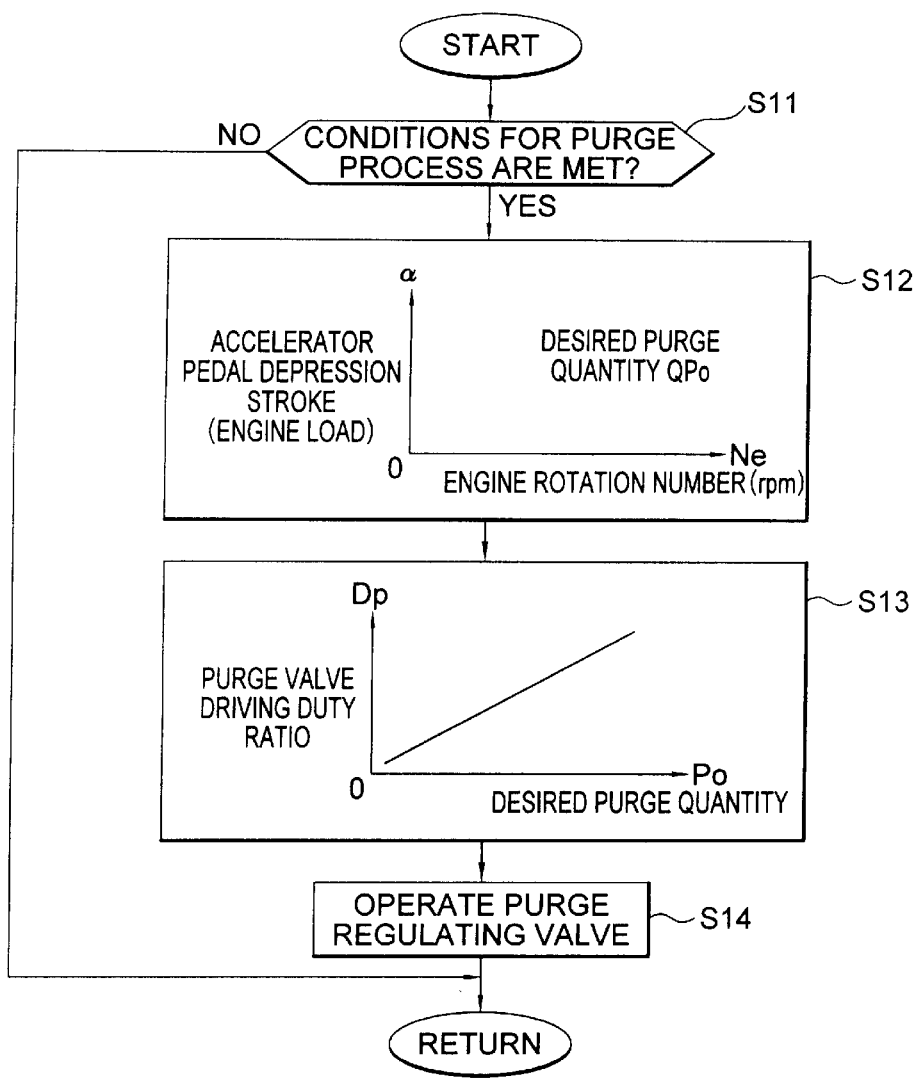
FIG. 13 is a flow chart for illustrating a purge process in the control system for the conventional cylinder injection type engine.
Figure 14:
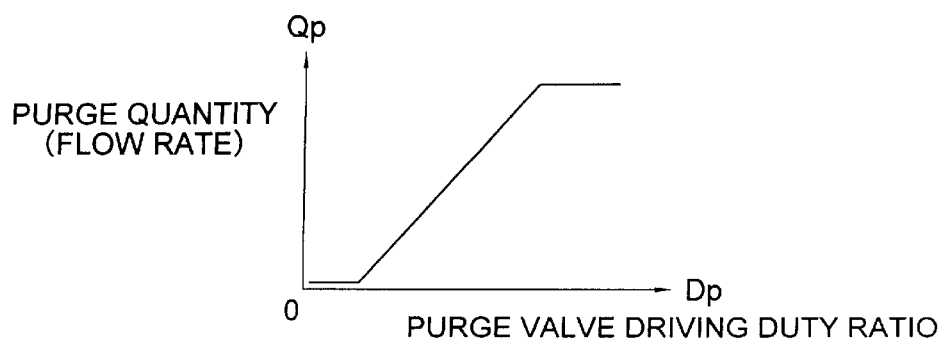
FIG. 14 is a characteristic diagram for graphically illustrating a relation between a purge valve driving duty ratio of a purge regulating valve and a purge quantity.

At first, in the step S6, the ECU 12 detects the air-fuel ratio F from the output of the air-fuel ratio sensor 6 in succession to the ordinary control processing (step S20, FIG. 1) described hereinbefore by reference to FIGS. 11 and 12.

Subsequently, the ECU 12 arithmetically determines the air-fuel ratio deviation $\Delta F$ ($=F-A/Fo$) and decides whether or not the absolute value of the air-fuel ratio deviation $\Delta F$ is smaller than a predetermined value $\Delta Fz$ which falls within the dead band Z (step S21).

When it is decided that the absolute value of the air-fuel ratio deviation $\Delta F$ is smaller than the predetermined value $\Delta Fz$ or $|F-A/Fo|<\Delta Fz$ (i.e., when the decision step S21 results in affirmation "YES"), indicating that the air-fuel ratio deviation $\Delta F$ falls within a range corresponding to the dead band Z, the processing routine illustrated in FIG. 1 makes return to the starting state "START" without executing any arithmetic processing for the variable EGR quantity $\Delta E$.

On the other hand, when $|F-A/Fo|\geq\Delta Fz$ (i.e., when the decision step S21 results in negation "NO"), indicating that the air-fuel ratio deviation $\Delta F$ is out of the range of the dead band Z, the current variable EGR quantity $\Delta E$ is arithmetically determined such that the air-fuel ratio deviation $\Delta F$ becomes zero (i.e., the condition $F=A/Fo$ is satisfied) on the basis of the relation illustrated in FIG. 2 (step S22).

In succession, the current variable EGR quantity $\Delta E$ is added accumulatively to the preceding EGR correction gain $Ec(n-1)$, to thereby determine the current EGR correction gain $Ec$ in accordance with the following expression (3) in a step S23.

$$Ec=Ec(n-1)+\Delta E \quad (3)$$

Parenthetically, it is assumed that the initial value of the EGR correction gain $Ec$ is previously set to e.g. "1.0".

Finally, the EGR valve opening degree $\theta E$ to be actually reflected in the EGR control signal E is determined by multiplying the desired EGR valve opening degree $\theta Eo$ resulting from the arithmetic operation for the ordinary control (step S20) by the EGR correction gain $Ec$ in accordance with the following expression (4) in a step S24.

$$\theta E=\theta Eo\times Ec \quad (4)$$

In succession, the EGR regulating valve 17 is driven by using the EGR control signal E reflecting the determined EGR valve opening degree $\theta E$, whereon the processing routine illustrated in FIG. 1 returns to the starting state "START".

In this way, by controlling through feedback the desired exhaust gas air-fuel ratio A/Fo by using the air-fuel ratio F detected actually upon control of the EGR regulating valve 17, error or deviation ascribable to the fresh air quantity QEn contained in the EGR quantity QE can be corrected or compensated for, whereby accuracy of the air-fuel ratio control can be significantly enhanced.

Further, by setting previously the error due to the fresh air QEn contained in the EGR quantity QE as the desired exhaust gas air-fuel ratio A/Fo and compensating for the difference between the desired exhaust gas air-fuel ratio A/Fo and the air-fuel ratio F of the combustion gas resulting from the combustion of the fuel actually injected at the controlled desired air-fuel ratio, structural or manufactural variance of the EGR regulating valve 17 can be tolerated.

Furthermore, in the sub-step (step S4 in FIG. 10) of the step S20, the fuel quantity to be injected with the controlled desired air-fuel ratio is arithmetically determined on the basis of the intake air quantity Qa. Thus, high control accuracy can be intrinsically assured for the air-fuel ratio of the mixture gas undergoing the combustion. In addition, because the desired exhaust gas air-fuel ratio A/Fo undergoes the feedback control, as described above, the EGR control accuracy can further be ensured.

At this juncture, it goes without saying that the ordinary air-fuel ratio feedback control is so performed so that the actual air-fuel ratio F coincides with the desired exhaust gas air-fuel ratio A/Fo in the suction-stroke injection mode (uniform stoichiometric burn mode), although illustration thereof is omitted.

Embodiment 2

In the control system for the cylinder injection type engine according to the first embodiment of the invention, the EGR correction gain $Ec$ is added accumulatively at every predetermined timing for determining arithmetically solely the EGR valve opening degree $\theta E$ (equivalent to the EGR quantity QE) in the step S24. In this conjunction, it is however mentioned that the EGR correction gain $Ec$ may be stored in order to enhance the initial control accuracy upon starting of the control procedure.

Figure 3:
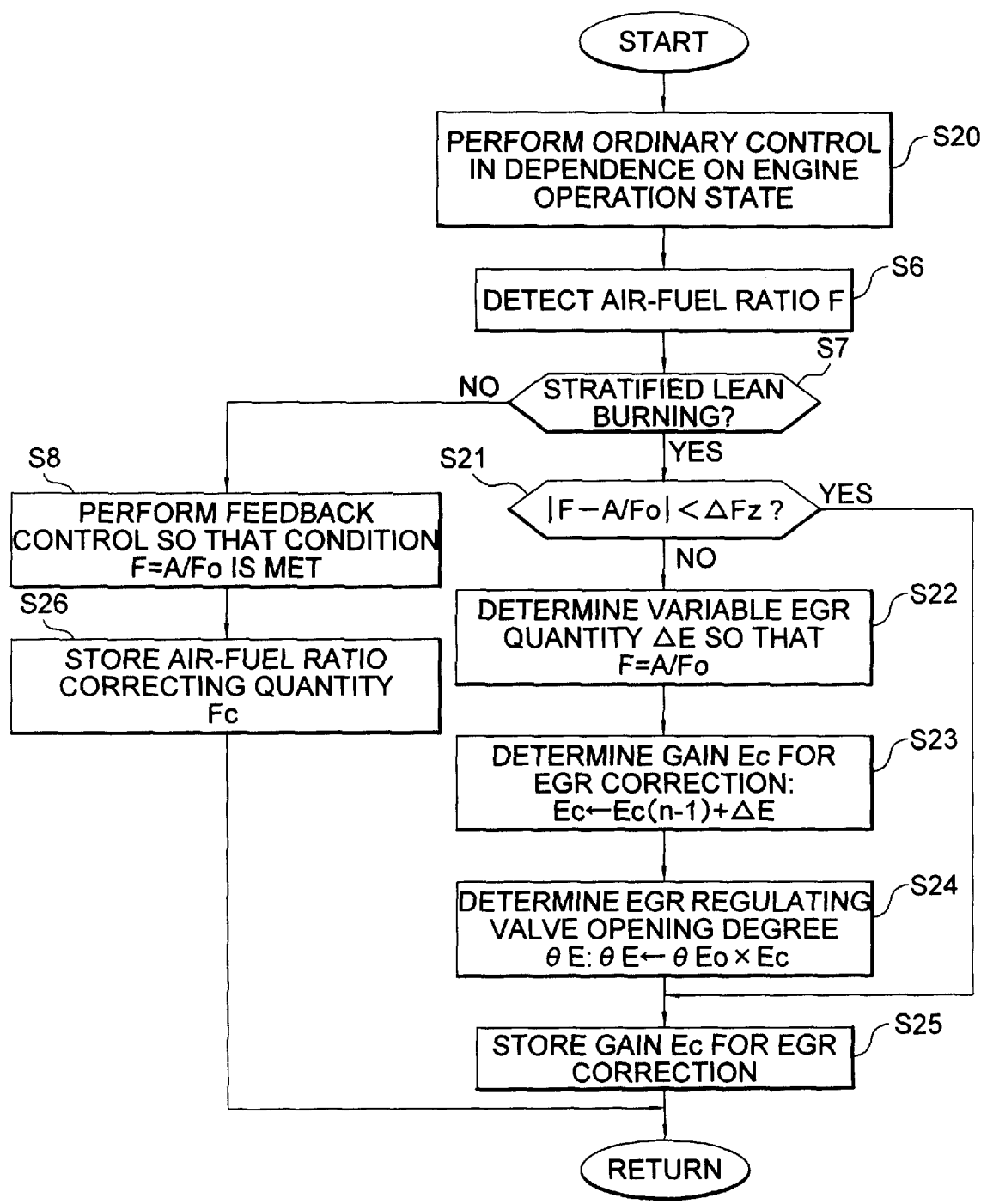
FIG. 3 is a flow chart for illustrating a feedback control operation of the control system for the cylinder injection type engine according to a second embodiment of the present invention, in which correction not only of the air-fuel ratio but also of the EGR quantity can be carried out.

A second embodiment of the present invention is directed to a control system for the cylinder injection type internal combustion engine in which a means for storing the EGR correction gain $Ec$ (set EGR quantity) is incorporated. FIG. 3 is a flow chart for illustrating the control operation of the control system for the cylinder injection type engine according to the instant embodiment not only in the compression-stroke injection mode but also in the suction-stroke injection mode.

In the flow chart shown in FIG. 3, the processing steps similar to those described hereinbefore by reference to FIG. 1 are denoted by like reference characters. Accordingly, repeated description in detail of these processing steps will be unnecessary. Further, it is to be mentioned that reference symbols S7 and S8 designate the fuel injection mode decision step and the air-fuel ratio feedback control step similar to those described hereinbefore by reference to FIG. 10.

In the control system now under consideration, the EGR quantity control means incorporated in the ECU 12 includes an EGR quantity memory or storage means for storing the set EGR quantity (EGR correction gain $Ec$) which is set variably through the feedback control of the EGR quantity QE in the compression-stroke injection mode so that the set EGR quantity can be used as the initial value upon starting of the succeeding feedback control of the EGR quantity QE.

Further, the fuel injection quantity setting means incorporated in the ECU 12 includes an fuel injection quantity memory or storage means for storing the set fuel injection quantity (equivalent to the air-fuel ratio correcting quantity Fc) set variably through to feedback control of the fuel injection quantity in the suction-stroke injection mode so that the set fuel injection quantity can be used as the initial value upon starting of the succeeding feedback control of the fuel injection quantity.

Now, when the ECU 12 decides in the injection mode decision step S7 shown in FIG. 3 that the engine is operating in the compression-stroke injection mode (stratified lean burn mode) (i.e., when the step S7 results in affirmation "YES"), feedback control processing of the EGR quantity QE is executed (steps S21 to S24). Thereafter, the EGR correction gain Ec is stored in a step S25, whereon the processing routine illustrated in FIG. 3 returns to the starting state "START".

On the other hand, when it is decided in the step S7 that the engine is operating in the suction-stroke injection mode (uniform stoichiometric burn mode)(i.e., when the step S7 results in negation "NO"), feedback control processing of the air-fuel ratio is executed so that the condition "F=A/Fo" is satisfied (step S8), and the air-fuel ratio correcting quantity Fc is stored in a step S26.

In this way, by storing the EGR correction gain Ec (set EGR quantity) and the air-fuel ratio correcting quantity Fc (set fuel injection quantity), these quantities can be reflected in the succeeding engine operation control routine upon starting thereof, whereby the initial control accuracy can be enhanced even at the beginning of the control of the EGR quantity QE and the air-fuel ratio F.

Furthermore, in the control system for the cylinder injection type engine according to the instant embodiment of the invention, the feedback control of the EGR quantity QE is controlled through the processing steps S21 to S24 only when the engine is operating in the compression-stroke injection mode (i.e., only when the decision step S7 results in "YES"). Thus, occurrence of error or deviation in the control of the EGR quantity can be suppressed with high reliability.

Embodiment 3

In the case of the control system for the cylinder injection type engine according to the second embodiment of the invention, the air-fuel ratio feedback control (step S8) is executed only when the engine is operating in the suction-stroke injection mode. However, in precedence to the injection mode decision (step S7), such control may be performed that the air-fuel ratio correcting quantity Fc (set fuel injection quantity) can be reflected in the fuel injection quantity Ja.

Figure 4:
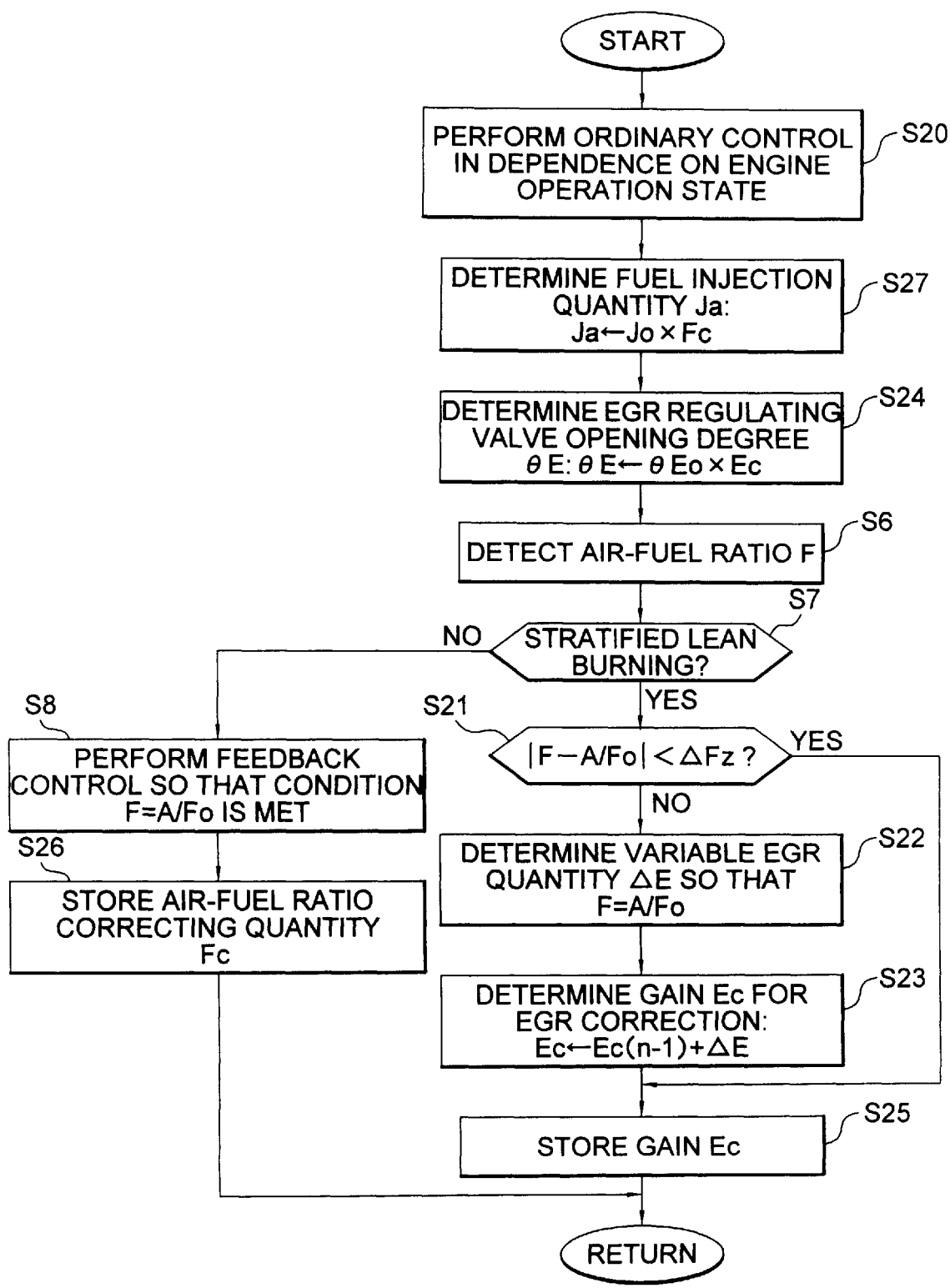
FIG. 4 is a flow chart for illustrating a feedback control operation of an EGR quantity in the control system for the cylinder injection type engine according to a third embodiment of the present invention, in which a correcting value is constantly employed.

A third embodiment of the invention is directed to the control system for the cylinder injection type internal combustion engine which is designed to perform the control mentioned above. FIG. 4 is a flow chart for illustrating control operation of the control system for the cylinder injection type engine according to the instant embodiment, which is designed to make the air-fuel ratio correcting quantity Fc be reflected in the fuel injection quantity Ja regardless of the fuel injection mode. In the flow chart shown in FIG. 4, the processing steps similar to those described hereinbefore by reference to FIG. 3 are denoted by like reference characters.

In the control system mow concerned, the fuel injection quantity setting means incorporated in the ECU 12 is designed to perform feedback control on the fuel injection quantity Ja so that the air-fuel ratio F within the exhaust pipe 1b coincides with the controlled desired air-fuel ratio not only in the suction-stroke injection mode but also in the compression-stroke injection mode.

Further, the EGR quantity control means is so designed as to perform the feedback control on the EGR quantity QE so that the air-fuel ratio F within the exhaust pipe 1b can coincide with the desired exhaust gas air-fuel ratio A/Fo not only in the compression-stroke injection mode but also in the suction-stroke injection mode.

More specifically, after execution of the ordinary control processing shown in FIG. 4 (step S20), the ECU 12 multiplies the desired fuel injection quantity Jo by the air-fuel ratio correcting quantity Fc in accordance with the undermentioned expression (5) to thereby determine arithmetically the fuel injection quantity Ja (step S27).

$$Ja = Jo \times Fc \quad (5)$$

In succession, the EGR quantity control means performs the feedback control of the EGR valve opening degree θE (equivalent to the EGR quantity QE) in a step S24 in the manner as described hereinbefore. In succession, the ECU 12 executes the step S6 for detecting the air-fuel ratio F, which is then followed by the injection mode decision step.

In this way, by correcting the fuel injection quantity Ja with the air-fuel ratio correcting quantity Fc, error or deviation ascribable to manufactural variance of the fuel injector 13 as well as but also manufactural variance or dispersion of the EGR regulating valve 17 can be compensated for. Thus, the control accuracy for the air-fuel ratio and the EGR quantity QE can further be enhanced.

Furthermore, because the fuel injection quantity setting means is designed to correct constantly the fuel injection quantity Ja with the air-fuel ratio correcting quantity Fc (set fuel injection quantity) corresponding to variance of the fuel injector 13 (step S27) while the EGR quantity control means is designed to correct constantly the EGR quantity QE by using the EGR correction gain Ec (set EGR quantity) which corresponds to variance of the EGR regulating valve 17, accuracy of the air-fuel ratio control accuracy can further be enhanced.

Embodiment 4

In the control system for the cylinder injection type engine according to the third embodiment of the invention, no consideration is paid to the conditions for validating the EGR control. A fourth embodiment of the invention is directed to the control system in which an EGR control validating condition decision means is incorporated in the ECU 12.

More specifically, in the control system now concerned, the control quantity arithmetic means incorporated in the ECU 12 includes an EGR control validating condition decision means for deciding the conditions for validating the feedback control of the EGR quantity QE in dependence on the engine operation state.

In this conjunction, it should further be mentioned that the control quantity arithmetic means is so designed as to perform feedback control on the fuel injection quantity Ja so that the air-fuel ratio within the exhaust pipe coincides with the desired exhaust gas air-fuel ratio so long as the injection mode is being set to the compression-stroke injection mode even if the condition for enabling the EGR control is not satisfied.

To say in another way, the control quantity arithmetic means is designed to control the air-fuel ratio correcting quantity in the suction-stroke injection mode (i.e., uniform stoichiometric burn mode) separately from the air-fuel ratio correcting quantity in the compression-stroke injection mode (i.e., stratified lean burn with the air-fuel ratio being larger than "25" inclusive). By virtue of this arrangement, the air-fuel ratio can be controlled with further enhanced accuracy.

Embodiment 5

In the control system for the cylinder injection type engine according to the third embodiment of the invention, only the air-fuel ratio correcting quantity Fc (set fuel injection quantity) set variably in the suction-stroke injection mode is stored in the storage means. A fifth embodiment of the present invention is directed to the control system in which an air-fuel ratio correcting quantity Fd set variably in the compression-stroke injection mode is stored in another storage means.

Figure 5:
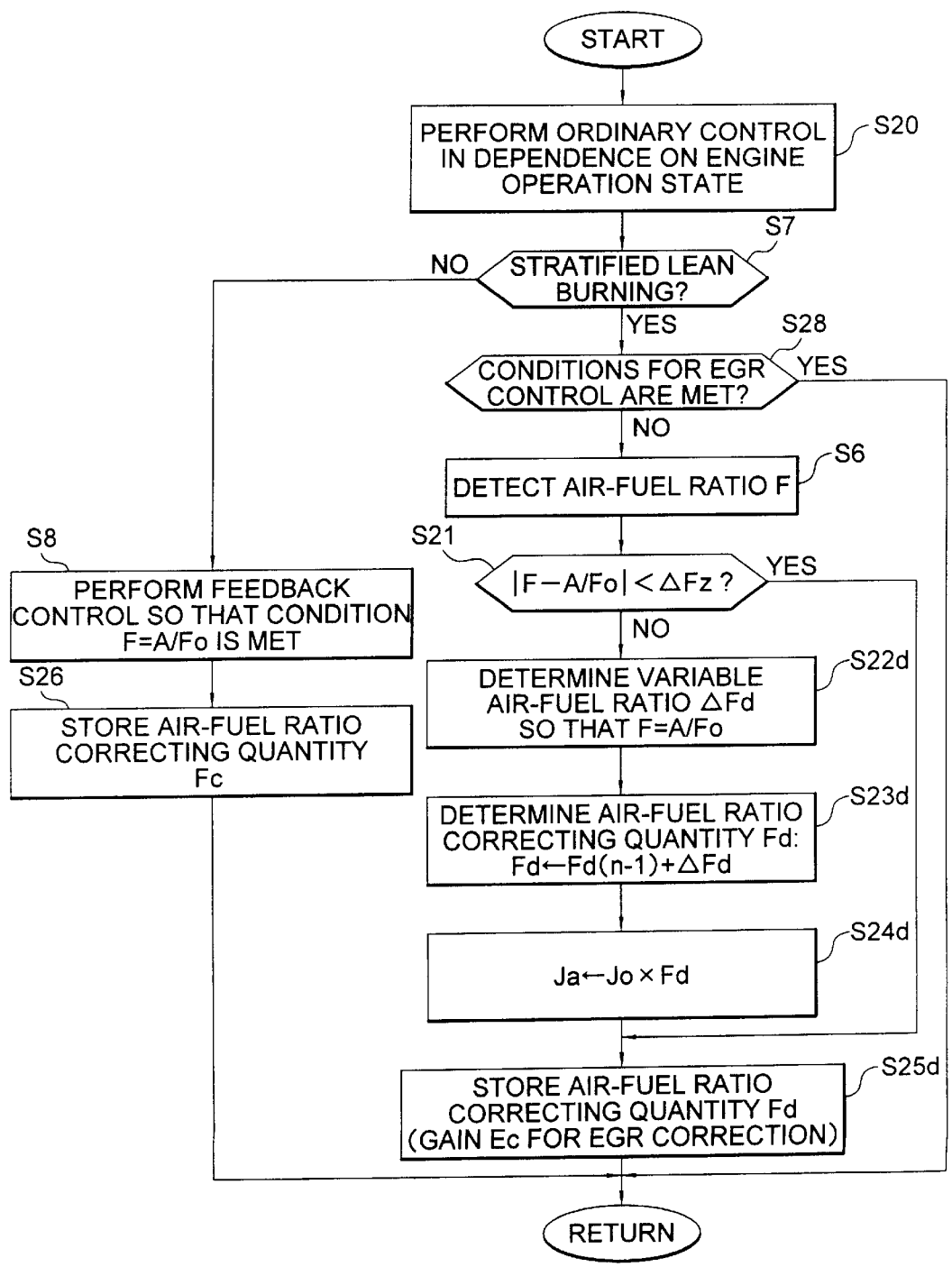
FIG. 5 is a flow chart for illustrating a feedback control operation carried out by the control system of the cylinder injection type engine according to a fifth embodiment of the present invention in which the correcting value is changed over, depending on whether or not a purge process control is being effectuated.

FIG. 5 is a flow chart for illustrating control operations carried out by the control system according to a fifth embodiment of the invention in which the air-fuel ratio correcting quantity Fd in the compression-stroke injection mode is also stored. In FIG. 5, the processing steps similar to these described hereinbefore by reference to FIG. 4 are designated by like reference characters. Accordingly, repeated description of these steps will be unnecessary.

It should first be mentioned that steps S22d to S25d are directed to the processings for the variable air-fuel ratio ΔFd and the air-fuel ratio correcting quantity Fd in the compression-stroke injection mode and bear correspondences to the previously mentioned steps S22 to S25, respectively. Further, it should also be mentioned that the EGR control processing (steps S22 to S25) is omitted from illustration for simplification.

In the control system for the cylinder injection type engine according to the instant embodiment of the invention, the control quantity arithmetic means incorporated in the ECU 12 includes an EGR control validating condition decision means for deciding the conditions which allow the feedback control of the EGR quantity QE to be performed in dependence on the engine operation states.

Further, the fuel injection setting means incorporated in the ECU 12 includes a fuel injection quantity storage means for storing the air-fuel ratio correcting quantities Fc and Fd (set injection quantities) which are set variably in the compression-stroke injection mode and the suction-stroke injection mode, respectively.

Furthermore, the control quantity arithmetic means is so designed as to perform feedback control on the fuel injection quantity Ja so that the air-fuel ratio F within the exhaust pipe 1b coincides with the controlled desired air-fuel ratio in both the suction-stroke injection mode and the compression-stroke injection mode and use as the initial values the set quantities (the air-fuel ratio correcting quantities Fc and Fd) stored in the fuel injection quantity storage means at the beginning of the succeeding feedback control of the fuel injection quantity Ja.

More specifically, when the suction-stroke injection mode is decided in the injection mode decision step S7 shown in FIG. 5 (i.e., when the step S7 result in negation "NO"), the step S26 for storing the air-fuel ratio correcting quantity Fc S26 is executed in succession to the air-fuel ratio feedback control step S8 mentioned previously, whereon the processing routine shown in FIG. 5 returns to the starting state "START".

On the contrary, when the compression-stroke injection mode is decided in the step S7 (i.e., "YES"), then the EGR control validating condition decision means makes decision in dependence on the engine operation state whether the condition for enabling the EGR control is met (step S28).

When the condition for enabling the EGR control is met (i.e., when the step S7 results in "YES"), the processing steps S22 to S25 (not shown in FIG. 5) described hereinbefore are executed, whereon the processing routine shown in FIG. 5 returns to the starting state "START".

On the contrary, when it is decided in the step S28 that the condition for enabling the EGR control is not met (i.e., when the step S28 results in "NO"), the air-fuel ratio F is detected in the step S6, which is then followed by the decision step S21 for the air-fuel ratio deviation ΔF.

When it is decided in the step S21 that ΔF<ΔFz (i.e., when the step S21 results in "YES"), the processing then proceeds to a step S25d which will be described later on. By contrast, when the decision step S21 results in "NO" (i.e., when ΔF≧ΔFz), the variable air-fuel ratio ΔFd is arithmetically determined so that the actual air-fuel ratio F coincides with the desired exhaust gas air-fuel ratio A/Fo (step S22d).

In succession, in a step S23d, the variable air-fuel ratio ΔFd is added accumulatively to an air-fuel ratio correcting quantity Fd(n−1) in the preceding processing routine to thereby determine the air-fuel ratio correcting quantity Fd for the compression-stroke injection mode in accordance with the following expression (6):

$$Fd = Fd(n-1) + \Delta Fd \tag{6}$$

Subsequently, the desired fuel injection quantity Jo determined for the ordinary control is multiplied by the air-fuel ratio correcting quantity Fd determined in accordance with the above expression (6), and then the fuel injection quantity Ja to be reflected in the actual fuel injection signal J is determined in a step S24d in accordance with the following expression (7):

$$Ja = Jo \times Fd \tag{7}$$

Thereafter, the fuel injector 13 is driven by using the fuel injection signal J which reflects the fuel injection quantity Ja as determined. Subsequently, the air-fuel ratio correcting quantity Fd determined for the compression-stroke injection mode is stored in a step S25d, whereon the processing routine illustrated in FIG. 5 makes return to the starting state "START".

In this way, by storing two air-fuel ratio correcting quantities Fc and Fd for the different injection modes, respectively, the control accuracy in the initial phase of the air-fuel ratio feedback control can further be enhanced.

Embodiment 6

In the control system for the cylinder injection type engine according to fifth embodiment of the invention, the error or deviation of the air-fuel ratio sensor 6 is not taken into consideration. However, a sixth embodiment of the present invention is directed to the control system for the cylinder injection type engine which is so designed to correct the error or deviation component contained in the air-fuel ratio F derived from the output of the air-fuel ratio sensor 6 on the basis of the air-fuel ratio correcting quantities Fc and Fd stored for every injection mode.

In the control system for the cylinder injection type engine according to the instant embodiment of the invention the control quantity arithmetic means incorporated in the ECU 12 includes a set fuel injection quantity comparison means for comparing the air-fuel ratio correcting quantity Fd (set fuel injection quantity) in the compression-stroke injection mode and the air-fuel ratio correcting quantity Fc (set fuel injection quantity) in the suction-stroke injection mode which are stored in the respective fuel injection quantity storage means, and an air-fuel ratio correcting means for correcting the error or deviation of the air-fuel ratio F detected by the air-fuel ratio sensor 6 on the basis of the result of comparison carried out by the set fuel injection quantity comparison means.

The air-fuel ratio correcting means may be so designed as to determine the air-fuel ratio deviation ΔF (=F−A/Fo) for the individual injection modes, respectively, on the basis of the deviation between the air-fuel ratio correcting quantities Fc and Fd, to thereby perform the air-fuel ratio control so that the error of the air-fuel ratio F can be compensated for.

In this way, by correcting the error or deviation of the air-fuel ratio sensor 6 on the basis of deviation or difference between the two air-fuel ratio correcting quantities Fc and Fd for the different injection modes, respectively, the control accuracy in the initial phase of the air-fuel ratio feedback control can further be enhanced.

Embodiment 7

In the forgoing description of the control system for the cylinder injection type engine according to first to sixth embodiments of the invention, the purge process executed by the purge regulating valve 26 (see FIG. 8) has not been taken into consideration. In a control system for the cylinder injection type engine according to a seventh embodiment of the invention, decision is made as to the purge process, wherein the feedback control of the EGR quantity QE is performed in a divisional manner in conformance with the purge process.

Figure 6:
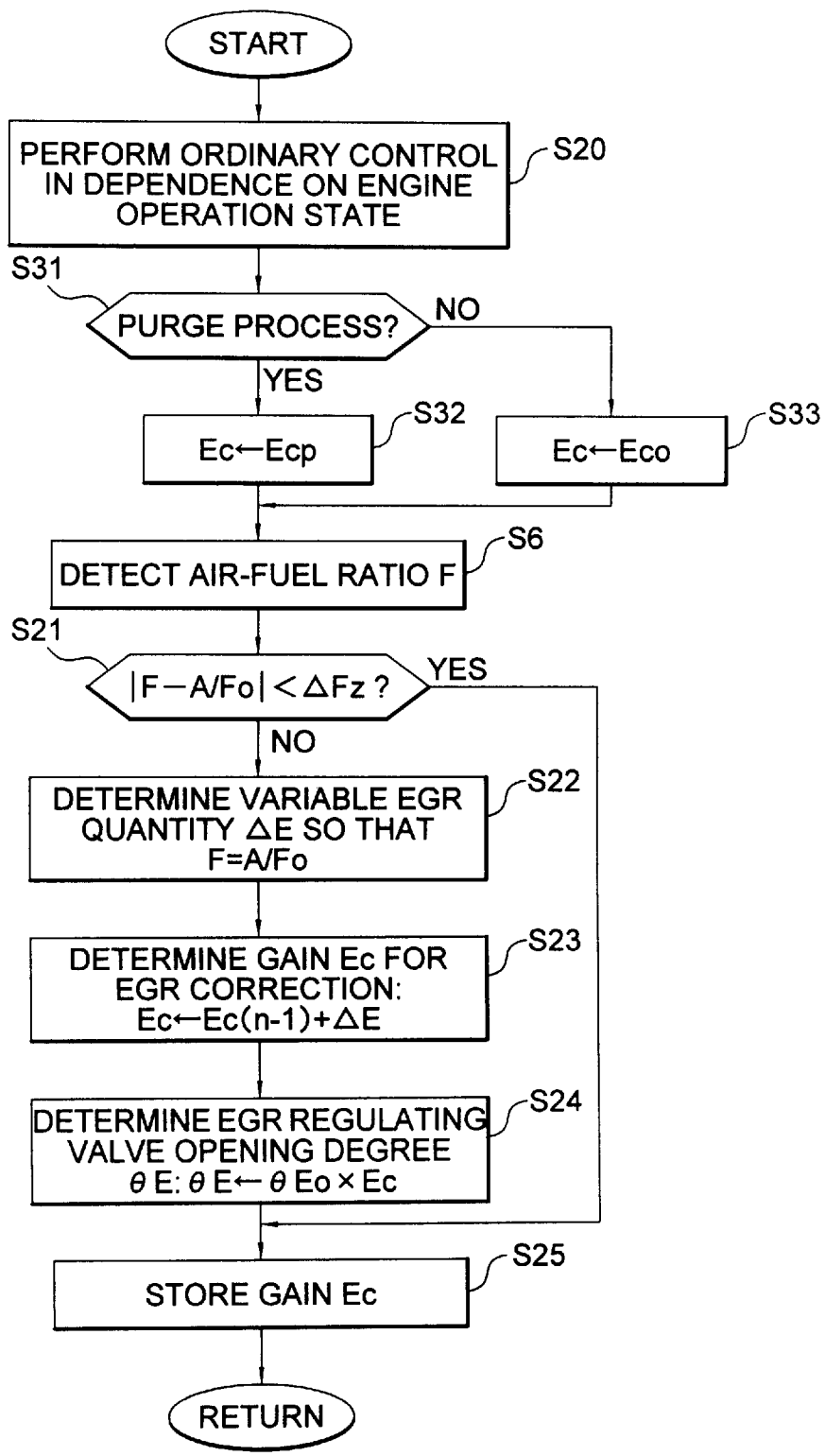
FIG. 6 is a flow chart for illustrating control operations carried out by the control system according to a seventh embodiment of the invention in which the purge process is taken into consideration.

FIG. 6 is a flow chart for illustrating control operations carried out by the control system according to a seventh embodiment of the invention in which the purge process is taken into consideration. In FIG. 6, the processing steps similar to these described hereinbefore are designated by like reference characters. Accordingly, repeated description of those steps will be unnecessary.

Figure 7:
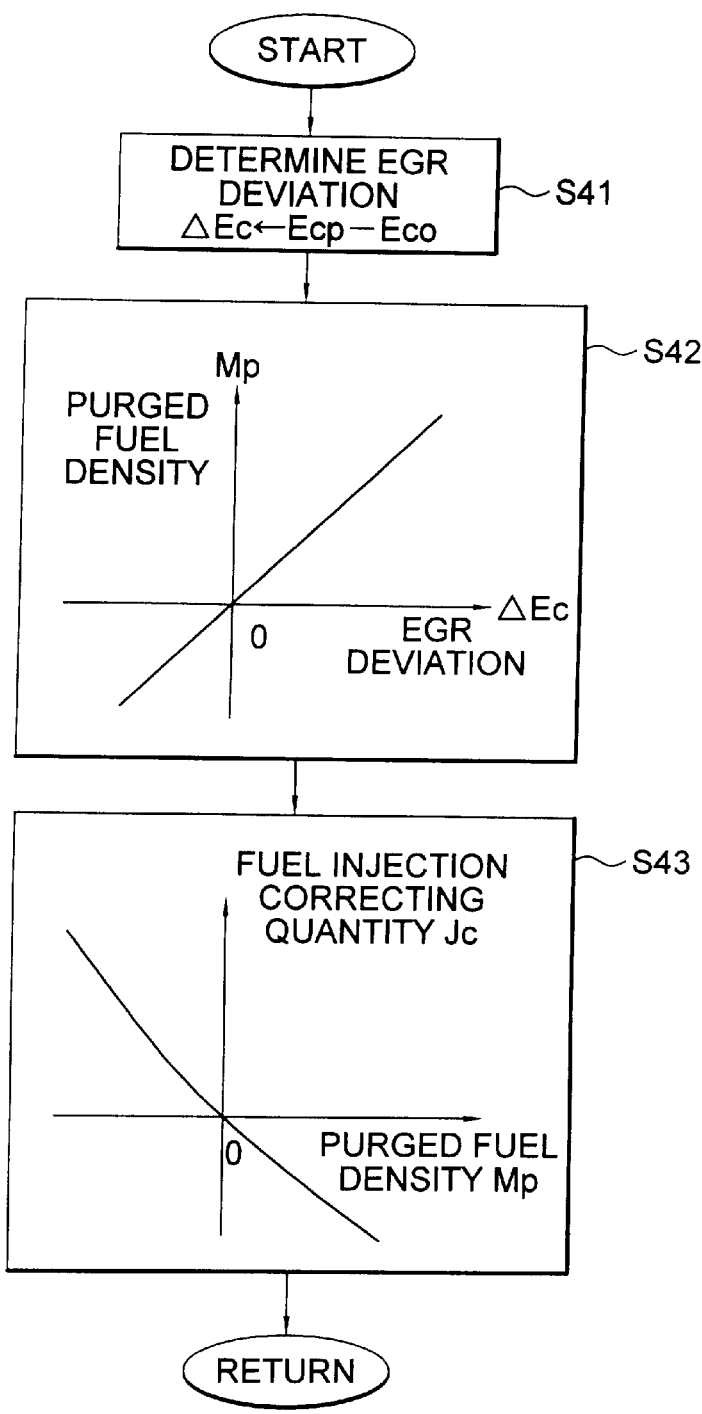
FIG. 7 is a flow chart for illustrating a processing procedure for arithmetically determining a density of fuel purged and hence a fuel injection correcting quantity on the basis of deviation of the EGR quantity which may occur, depending on whether or not the purge process is effectuated.

Further, FIG. 7 is a flow chart for illustrating control operations for correcting the fuel injection correcting quantity Jc by arithmetically determining a fuel concentration or density Mp of the gas as purged.

Further, it should be mentioned that the actual air-fuel ratio feedback control processing in the suction-stroke fuel injection mode (steps S7, S8 and S26) is omitted from illustration for simplification.

In the control system for the cylinder injection type engine according to the instant embodiment of the invention, the ECU 12 includes a purge control means for introducing the evaporated gas from the fuel tank 23 into the intake pipe 1a by way of the purge regulating valve 26 (purge process means). Further, the control quantity arithmetic means incorporated in the ECU 12 includes a purge decision means for deciding whether or not the evaporated gas is undergoing the purge process.

On the other hand, the control quantity arithmetic means includes a purged fuel density estimating means which is designed to arithmetically estimate the fuel density Mp of the gas contained in the evaporated gas as purged on the basis of an EGR deviation $\Delta$Ec induced through the feedback control performed on the EGR quantity QE in conformance with the result of decision made by the purge decision means.

Furthermore, the control quantity arithmetic means includes a correction control means for correcting the essential fuel quantity, wherein the correction control means is so designed as to correct at least one of a purge quantity QP (see FIG. 14) regulated by the purge regulating valve 26 serving as the purge processing means and the fuel injection quantity Ja of the fuel injector 13.

Furthermore, the EGR quantity control means is designed to perform the divisional feedback control of the EGR quantity QE in dependence on the result of the decision made by the purge decision means.

Referring to FIG. 6, after execution of the step S20, the purge decision means makes decision on the basis of the purge control signal P as to whether or not the purge process is being executed (i.e., whether or not the purge regulating valve 26 is opened) in a step S31.

When it is decided that the purge process is being executed (i.e., when the decision step S31 results in "YES"), an EGR correction gain Ecp (EGR correction gain Ecp) validated when the purge process is being carried out is set as the EGR correction gain Ec in a step S32. On the contrary, when it is decided that the purge process is not being carried out (i.e., when the decision step S31 results in "NO"), the EGR correction gain Eco determined on the presumption that the purge process is not executed is set as the EGR correction gain Ec in a step S33, whereupon the processing proceeds to a step S6 of detecting the air-fuel ratio F.

Subsequently, the EGR quantity control steps S21 to S24 are executed in the manner described hereinbefore, and the EGR correction gain Ec is stored (step S25), whereon the processing routine illustrated in FIG. 6 returns to the starting state "START".

When the purge process is being carried out, at first, as can be seen from FIG. 7, the purged fuel density estimating means incorporated in the purge control means arithmetically determines the deviation $\Delta$Ec of the EGR quantity (referred to as the EGR deviation $\Delta$Ec)(=Ecp=Eco) between the EGR correction gain Ecp for the case where the purge process is validated and the EGR correction gain Eco for the case where the purge process is not validated in a step S41, which is then followed by a step S42 where arithmetic determination of the purged fuel density Mp is performed on the basis of the EGR deviation $\Delta$Ec.

Subsequently, the correction control means incorporated in the purge control means corrects at least one of the purge quantity QP determined by the purge processing means and the fuel injection quantity Ja of the fuel injector 13.

Incidentally, in the case of the processing routine illustrated in FIG. 7, the fuel injection correcting quantity Jc for the fuel injection quantity Ja of the fuel injector 13 is determined (step S43).

In that case, the purged fuel density Mp can be given approximately by a positive linear function of the EGR deviation $\Delta$Ec, while the fuel injection correcting quantity Jc can be represented approximately as a negative linear function of the purged fuel density Mp.

In other words, in the step S42, the purged fuel density Mp assumes greater value as the EGR deviation $\Delta$Ec increases. Furthermore, in the step S43, the fuel injection correcting quantity Jc is set to a smaller value as the purged fuel density Mp is higher, in order to evade the excessively fuel-rich state, as a result of which the fuel injection quantity Ja is decreased correspondingly.

In this way, during the purge process (i.e., when the evaporated gas is additively introduced), the intrinsic fuel quantity increases for a same fuel injection quantity Ja of the fuel injector 13. Consequently, the fuel injection quantity Ja has to be reduced correctively.

In this manner, the EGR correction gain Ec (set EGR quantity) is set correspondingly and individually in dependence on the different values of the fuel injection quantity Ja, it is possible to correct or compensate for error making apparent in the air-fuel ratio control during the purge process.

Besides, because the purged fuel density Mp is detected on the basis of difference of the set EGR quantity (EGR deviation $\Delta$Ec), depending on whether the purge process (additive introduction of the evaporated gas) is carried out or not, the fuel injection quantity Ja (or the purge quantity QP) can be correctively controlled in dependence on the purged fuel density Mp, whereby the air-fuel ratio control accuracy can equally be enhanced even when the purge process is being carried out.

Parenthetically, it should be added that although the EGR correction gain Ec is changed in dependence on whether or not the purge process is carried out in the processing routine illustrated in FIG. 6, the EGR quantity QE itself may be changed, substantially to the same effect.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

Accordingly, all suitable modifications and equivalents may be resorted to, falling within the spirit and scope of the invention.

What is claimed is:

1. A control system for an internal combustion engine of a cylinder injection type, comprising:
   fuel injection valves for injecting fuel directly into a plurality of cylinders, respectively, of said internal combustion engine;
   exhaust gas recirculation regulating means for regulating an exhaust gas recirculation quantity representative of a quantity of exhaust gas of the engine which is to be recirculated to an intake pipe thereof,
   sensors of various types for detecting operation states of said internal combustion engine; and
   control quantity arithmetic means for controlling said fuel injection valves and said exhaust gas recirculation regulating means in dependence on the engine operation state,
   wherein said various types of sensors includes:
      an intake air quantity sensor for detecting the quantity of intake air fed to said engine; and
      an air-fuel ratio sensor disposed within an exhaust pipe of said engine for detecting an air-fuel ratio of the exhaust gas within said exhaust pipe,
   wherein said control quantity arithmetic means comprising:
      injection mode changeover means for changing over an injection mode of said fuel injection valve between a compression-stroke injection mode and a suction-stroke injection mode in dependence on said engine operation state;
      exhaust gas recirculation quantity control means for arithmetically determining a desired exhaust gas recirculation quantity in dependence on the engine operation state and controlling said exhaust gas recirculation quantity to said desired exhaust gas recirculation quantity by means of said exhaust gas recirculation regulating means;
      desired exhaust gas air-fuel ratio arithmetic means for arithmetically determining a desired air-fuel ratio within said exhaust pipe of said engine in dependence on the engine operation state;
      controlled desired air-fuel ratio arithmetic means for arithmetically determining a controlled desired air-fuel ratio within said cylinder in dependence on the engine operation state; and
      fuel injection quantity setting means for setting a fuel injection quantity of said fuel injection valve in dependence on said controlled desired air-fuel ratio, said intake air quantity and said injection mode, and
   wherein said exhaust gas recirculation quantity control means is so designed as to perform a feedback control on said exhaust gas recirculation quantity so that the air-fuel ratio of the exhaust gas coincides with said desired exhaust gas air-fuel ratio.

2. A control system for a cylinder injection type internal combustion engine according to claim 1,
   wherein said exhaust gas recirculation quantity control means includes exhaust gas recirculation quantity storage means for storing a set exhaust gas recirculation quantity set changeably through feedback control of said exhaust gas recirculation quantity, and
   wherein said set exhaust gas recirculation quantity is employed as an initial value upon starting of a succeeding feedback control of said exhaust gas recirculation quantity.

3. A control system for a cylinder injection type internal combustion engine according to claim 1,
   wherein said exhaust gas recirculation quantity control means executes the feedback control only when said injection mode is set to the compression-stroke injection mode.

4. A control system for a cylinder injection type internal combustion engine according to claim 1,
   wherein said fuel injection quantity setting means performs a feedback control on the fuel injection quantity at least when said injection mode is set to a suction-stroke injection mode so that said air-fuel ratio of the exhaust gas can coincide with said controlled desired air-fuel ratio, and
   wherein said exhaust gas recirculation quantity control means performs the feedback control on the exhaust gas recirculation quantity at least when said injection mode is set to a compression-stroke injection mode so that said air-fuel ratio of the exhaust gas can coincide with said desired exhaust gas air-fuel ratio.

5. A control system for a cylinder injection type internal combustion engine according to claim 4,
   wherein said fuel injection quantity setting means includes fuel injection quantity storage means for storing a set fuel injection quantity set changeably through feedback control of said fuel injection quantity so that said set fuel injection quantity is used as an initial value upon starting of a succeeding feedback control of said fuel injection quantity, and
   wherein said exhaust gas recirculation quantity control means includes exhaust gas recirculation quantity storage means for storing said set exhaust gas recirculation quantity set changeably through feedback control of said exhaust gas recirculation quantity so that said set exhaust gas recirculation quantity can be used as an initial value upon starting of a succeeding feedback control of said exhaust gas recirculation quantity.

6. A control system for a cylinder injection type internal combustion engine according to claim 5,
   wherein said fuel injection quantity setting means corrects said fuel injection quantity by using said set fuel injection quantity stored in said fuel injection quantity storage means upon feedback control of said fuel injection quantity, and
   wherein said exhaust gas recirculation quantity control means corrects said exhaust gas recirculation quantity by using said set exhaust gas recirculation quantity stored in said exhaust gas recirculation quantity storage means upon feedback control of said exhaust gas recirculation quantity.

7. A control system for a cylinder injection type internal combustion engine according to claim 4,
   wherein said control quantity arithmetic means further includes exhaust gas recirculation control condition decision means for deciding condition for enabling feedback control of said exhaust gas recirculation quantity in dependence on the engine operation state, and wherein said fuel injection quantity setting means performs feedback control of said fuel injection quantity so that the air-fuel ratio within said exhaust pipe coincides with said desired exhaust gas air-fuel ratio so long as said injection mode is set to the compression-stroke injection mode even if said condition for the exhaust gas recirculation control is not satisfied.

8. A control system for a cylinder injection type internal combustion engine according to claim 1, wherein said fuel injection quantity setting means includes fuel injection quantity storage means for storing set fuel injection quantities which are set variably in said compression-stroke injection mode and said suction-stroke injection mode, respectively, and wherein when said injection mode is set between a suction-stroke injection mode and a compression-stroke injection mode, feedback control of said fuel injection quantity is performed so that the air-fuel ratio within said exhaust pipe coincides with said controlled desired air-fuel ratio, and wherein said set fuel injection quantities stored in said fuel injection quantity storage means are employed as initial values upon starting of a succeeding feedback control of said fuel injection quantity.

9. A control system for a cylinder injection type internal combustion engine according to claim 8, wherein said control quantity arithmetic means further includes:

set fuel injection quantity comparison means for comparing the set fuel injection quantities for said compression-stroke injection mode and for said suction-stroke injection mode, respectively, said set fuel injection quantities being stored in said fuel injection quantity storage means; and air-fuel ratio correcting means for compensating for error component of said air-fuel ratio detected by said air-fuel ratio sensor on the basis of the result of the comparison performed by said set fuel injection quantity comparison means.

10. A control system for a cylinder injection type internal combustion engine according to claim 1, further comprising:

a fuel tank for storing fuel for injection into said engine; and purge means for introducing evaporated gas generated within said fuel tank into said intake pipe through a purge process, wherein said control quantity arithmetic means includes purge decision means for deciding whether or not said evaporated gas is undergoing the purge process, and wherein said exhaust gas recirculation quantity control means performs a divisional feedback control of said exhaust gas recirculation quantity in dependence on the result of the decision made by said purge decision means.

11. A control system for a cylinder injection type internal combustion engine according to claim 10, wherein said control quantity arithmetic means includes:

purged fuel density estimating means for arithmetically estimating a purged fuel density in said evaporated gas on the basis of a deviation involved in the feedback control performed on said exhaust gas recirculation quantity in conformance with the result of the decision made by said purge decision means; and correction control means for correcting at least one of a purge quantity in said purge process and said fuel injection quantity in dependence on the density of said purged fuel.

* * * * *